(12) United States Patent
Horigome et al.

(10) Patent No.: US 8,613,614 B2
(45) Date of Patent: Dec. 24, 2013

(54) BLOW MOLDING APPARATUS

(71) Applicant: Nissei ASB Machine Co., LTD., Nagano (JP)

(72) Inventors: Hiroshi Horigome, Nagano-ken (JP); Kazuyuki Yokobayashi, Ueda (JP); Daisaburo Takehana, Ueda (JP)

(73) Assignee: Nissei ASB Machine Co., Ltd., Nagano (JP)

( * ) Notice: Subject to any disclaimer, the term of this patent is extended or adjusted under 35 U.S.C. 154(b) by 0 days.

(21) Appl. No.: 13/760,981

(22) Filed: Feb. 6, 2013

(65) Prior Publication Data
US 2013/0149408 A1 Jun. 13, 2013

Related U.S. Application Data

(63) Continuation of application No. 13/417,276, filed on Mar. 11, 2012, now Pat. No. 8,371,840, which is a continuation of application No. PCT/JP2010/064586, filed on Aug. 27, 2010.

(30) Foreign Application Priority Data

Sep. 11, 2009 (JP) ................................. 2009-210876
Feb. 26, 2010 (JP) ................................. 2010-042953
Apr. 1, 2010 (JP) ................................. 2010-084962

(51) Int. Cl.
*B29C 49/06* (2006.01)
*B29C 49/36* (2006.01)

(52) U.S. Cl.
USPC ........... 425/533; 425/534; 425/538; 425/540; 425/556

(58) Field of Classification Search
USPC ......... 425/195, 526, 533, 534, 537, 538, 540, 425/541, 556
See application file for complete search history.

(56) References Cited

U.S. PATENT DOCUMENTS

| 3,183,552 | A | * | 5/1965 | Farkas | .......................... 425/163 |
| 4,155,974 | A | | 5/1979 | Valyi | |
| 4,285,657 | A | | 8/1981 | Ryder | |
| 4,457,689 | A | * | 7/1984 | Aoki | .............................. 425/525 |
| 5,169,654 | A | | 12/1992 | Koga | |
| 5,206,039 | A | | 4/1993 | Valyi | |
| 5,261,809 | A | | 11/1993 | Koga | |
| 5,744,176 | A | | 4/1998 | Takada et al. | |
| 6,019,933 | A | | 2/2000 | Takada et al. | |

FOREIGN PATENT DOCUMENTS

| JP | A-03-203622 | 5/1991 |
| JP | A-05-031795 | 9/1993 |
| JP | A-05-237921 | 9/1993 |

(Continued)

*Primary Examiner* — Robert B Davis
(74) *Attorney, Agent, or Firm* — David L. Hoffman; Hoffman Patent Group

(57) ABSTRACT

In an embodiment, a neck mold assembly includes N rows of holding plates, each of the N rows of holding plates holding a plurality of neck molds. The neck mold assembly also includes a supporting-mechanism that supports the N rows of holding plates. The supporting mechanism includes at least one reinforcement shaft that is provided along a row direction of the N rows of holding plates, and two first securing sections that are secured at either end of the at least one reinforcement shaft. Each of the N rows of holding plates has at least one first through-hole that receives the at least one reinforcement shaft.

17 Claims, 25 Drawing Sheets

(56) References Cited

FOREIGN PATENT DOCUMENTS

| JP | A-06-305002 | 11/1994 |
| JP | A-08-132517 | 5/1996 |
| JP | A-08-244103 | 9/1996 |
| JP | A-10-076567 | 3/1998 |
| JP | A-2003-236923 | 8/2003 |
| JP | A-2005-007797 | 1/2005 |

* cited by examiner

BLOW MOLDING APPARATUS

CROSS REFERENCE TO RELATED APPLICATIONS

This application is a continuation of U.S. patent application Ser. No. 13/417,276, which was filed on Mar. 11, 2012, now U.S. Pat. No. 8,371,840, and which is a continuation of International Patent Application No. PCT/JP2010/064586, having an international filing date of Aug. 27, 2010, which designated the United States, and which claims the benefit of Japanese Patent Application No. 2009-210876 filed on Sep. 11, 2009, Japanese Patent Application No. 2010-042953 filed on Feb. 26, 2010, and Japanese Patent Application No. 2010-084962 filed on Apr. 1, 2010, the entirety of each of the above U.S., International, and Japanese applications being incorporated herein by reference.

BACKGROUND

The present invention relates to a blow molding apparatus that can change the row pitch of a plurality of rows of neck molds.

A blow molding apparatus that changes the row pitch of two rows of neck molds has been known. In JP-B-6-49331, the row pitch of blow cavity molds when the blow cavity molds are opened after blow molding is set to differ from the row pitch of the blow cavity molds during a period other than the mold opening period. In JP-B-8-13501, the row pitch of two rows of holding plates that respectively hold neck molds is changed using a link mechanism.

Japanese Patent No. 4319863 discloses a rotary transfer blow molding apparatus that is configured so that a transfer plate that is intermittently transferred is moved upward and downward in an injection molding station that is one of a plurality of stations. JP-A-8-244103 discloses a structure in which a holding plate that holds preforms is supported by a rotary transfer plate by sandwiching each end of the holding plate between a guide plate and a fall prevention member.

SUMMARY

According to one aspect of the invention, there is provided a blow molding apparatus comprising:

N (N is an integer equal to or larger than 2) rows of holding plates, each of the N rows of holding plates holding a plurality of neck molds, and being transferred along a transfer direction;

a support-transfer member that transfers the N rows of holding plates, the support-transfer member supporting the N rows of holding plates so that a row pitch of the N rows of holding plates can be changed;

an injection molding station that injection-molds a plurality of preforms, the injection molding station including N rows of injection cavity molds that are clamped to the plurality of neck molds that are held by each of the N rows of holding plates;

a temperature control station that includes N rows of temperature-controlled pot molds that are disposed on a downstream side of the injection molding station in the transfer direction, and performs a temperature control operation by disposing the plurality of preforms held by the N rows of holding plates in the N rows of temperature-controlled pot molds;

a blow molding station that includes N rows of blow molds that are disposed on a downstream side of the temperature control station in the transfer direction, and blow-molds the plurality of preforms held by the N rows of holding plates into a plurality of containers; and a row pitch change section that changes the row pitch of the N rows of holding plates so that P1<P3<P2 is satisfied, P1 being the row pitch of the N rows of holding plates when they hold the plurality of preforms that have been injection-molded, P2 being the row pitch of the N rows of holding plates when they hold the plurality of containers that have been blow-molded, and P3 being the row pitch of the N rows of holding plates when they hold the plurality of preforms that are transferred to the N rows of blow molds that are opened.

According to another aspect of the invention, there is provided a blow molding apparatus comprising:

N (N is an integer equal to or larger than 2) rows of holding plates;

N rows of blow molds that blow-mold a plurality of preforms held by the N rows of holding plates into a plurality of containers;

a mold closing/opening device that closes/opens the N rows of blow molds; and a row pitch change section that changes a row pitch of the N rows of holding plates, each of the N rows of blow molds including a pair of blow cavity split molds, a row pitch of the N rows of blow molds being P1 when the N rows of blow molds are closed, the row pitch of the N rows of holding plates being set to P1 when the N rows of blow molds are closed, the pair of blow cavity split molds in at least one row among the N rows being disposed at unsymmetrical positions with respect to a blow molding centerline when the N rows of blow molds are closed, the row pitch of the N rows of blow molds being P2 (P2>P1) when the N rows of blow molds are opened, the mold closing/opening device including two mold closing/opening sections that close/open two blow cavity split molds of the N rows of blow molds that are positioned on an outer side in a row direction, and a split mold synchronization member that engages and moves the two blow cavity split molds in synchronization, and being formed without using a tie rod, and the row pitch change section engaging the split mold synchronization member that is displaced corresponding to synchronization movement of the two blow cavity split molds, and changing the row pitch of the two rows of holding plates in synchronization with movement of the two blow cavity split molds.

According to another aspect of the invention, there is provided a blow molding apparatus comprising:

N rows of holding plates, each of the N rows of holding plates holding a plurality of neck molds;

a support-transfer member that transfers the N rows of holding plates, the support-transfer member supporting the N rows of holding plates so that a row pitch of the N rows of holding plates can be changed;

an injection molding station that injection-molds a plurality of preforms, the injection molding station including N rows of injection cavity molds that are clamped to the plurality of neck molds that are held by each of the N rows of holding plates; and a blow molding station that includes N rows of blow molds, and blow-molds the plurality of preforms held by the N rows of holding plates into a plurality of containers, the support-transfer member including:

two rail members that are disposed on either end of the N rows of holding plates in a longitudinal direction;

at least one reinforcement shaft that is provided along a row direction of the N rows of holding plates; and two first securing sections that secure either end of the at least one reinforcement shaft, each of the N rows of holding plates including two guide members that are guided along the two rail members, and support the N rows of holding plates so that the row pitch of the N rows of holding plates can be changed, and each of the N rows of holding plates having at least one first through-hole that receives the at least one reinforcement shaft.

DESCRIPTION OF EXEMPLARY EMBODIMENTS

Figure 1:
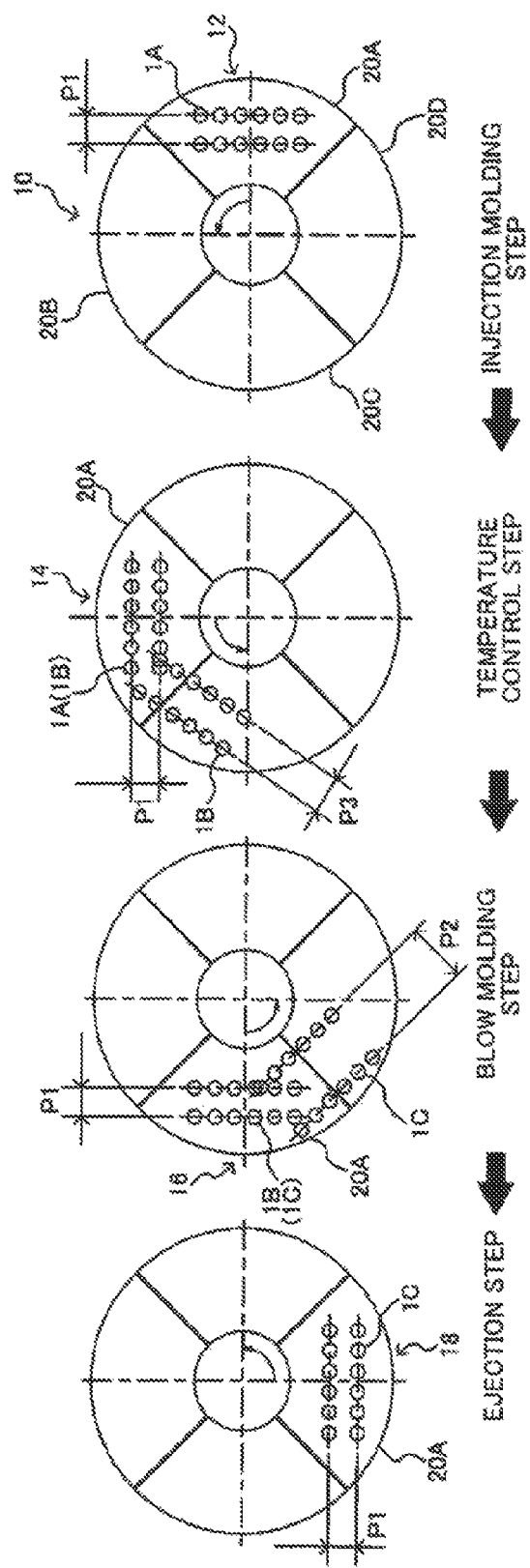
FIG. 1 is a schematic view illustrating four main steps performed by a rotary transfer blow molding apparatus according to one embodiment of the invention.
Figure 2:
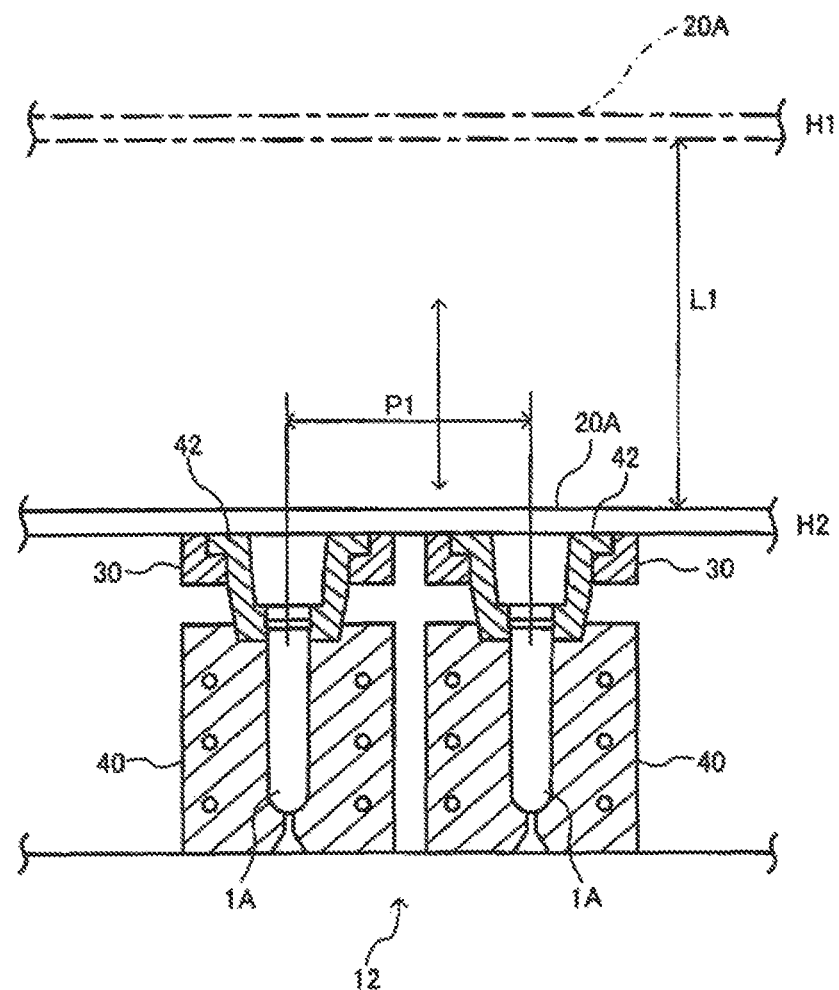
FIG. 2 is a view showing an injection molding step that injection-molds two rows of preforms disposed at a row pitch P1.

When using a one-stage method (hot parison method) that blow-molds a preform (parison) that retains heat applied during injection molding into a container, the number of preforms that can be injection-molding at the same time is limited. On the other hand, productivity can be improved by increasing the number of rows of preforms (i.e., increasing the number of preforms that are molded at the same time) when the preform is small (see JP-B-6-49331 and JP-B-8-13501).

When using a plurality of rows of holding plates that hold the preforms, it is necessary to use a plurality of rows of molds. When the number of rows is 2, the row pitch is changed between a wide pitch when two rows of blow molds are opened and a narrow pitch during injection molding or the like (see JP-B-6-49331 and JP-B-8-13501).

In JP-B-8-13501, the mold closing/opening device that closes/opens the two rows of blow molds performs a single-sided operation, and the blow molds are connected using a horizontal tie rod.

Several aspects of the invention may provide a highly flexible blow molding apparatus that can easily implement a reduction in molded article transfer path and time loss while improving productivity by transferring a plurality of rows of molded articles, can easily deal with an optional operation (e.g., preliminary blow molding during a temperature control step), and allows an easy change in the number of rows and the like.

Several aspects of the invention may provide a highly flexible blow molding apparatus that allows easy installation/removal of a plurality of rows of blow molds, and allows a change in the number of rows of blow molds.

Several aspects of the invention may provide a blow molding apparatus that can improve the quality of simultaneously molded articles while improving productivity by transferring a plurality of rows of molded articles.

According to one embodiment of the invention, there is provided a blow molding apparatus comprising:

N (N is an integer equal to or larger than 2) rows of holding plates, each of the N rows of holding plates holding a plurality of neck molds, and being transferred along a transfer direction;

a support-transfer member that transfers the N rows of holding plates, the support-transfer member supporting the N rows of holding plates so that a row pitch of the N rows of holding plates can be changed;

an injection molding station that injection-molds a plurality of preforms, the injection molding station including N rows of injection cavity molds that are clamped to the plurality of neck molds that are held by each of the N rows of holding plates;

a temperature control station that includes N rows of temperature-controlled pot molds that are disposed on a downstream side of the injection molding station in the transfer direction, and performs a temperature control operation by disposing the plurality of preforms held by the N rows of holding plates in the N rows of temperature-controlled pot molds;

a blow molding station that includes N rows of blow molds that are disposed on a downstream side of the temperature control station in the transfer direction, and blow-molds the plurality of preforms held by the N rows of holding plates into a plurality of containers; and a row pitch change section that changes the row pitch of the N rows of holding plates so that P1<P3<P2 is satisfied, P1 being the row pitch of the N rows of holding plates when they hold the plurality of preforms that have been injection-molded, P2 being the row pitch of the N rows of holding plates when they hold the plurality of containers that have been blow-molded, and P3 being the row pitch of the N rows of holding plates when they hold the plurality of preforms that are transferred to the N rows of blow molds that are opened.

According to one aspect of the invention, the row pitch P3 (P1<P3<P2) is provided in addition to the row pitches P1 and P2, and the row pitch of the N rows of holding plates that hold the plurality of preforms that are transferred to the N rows of open blow molds is set to P3. This makes it possible to deal with various molding methods that cannot be implemented using two pitches. Specifically, when the number of rows of holding plates is 2, and the preforms are preliminary blow-molded in the temperature control station (see JP-B-8-13501), since the body of the preforms expands due to preliminary blow molding, the preforms cannot be transferred to the open blow molds unsymmetrically when the row pitch is P1 that is employed during injection molding. When the number of rows of blow molds is an odd number equal to or larger than 3, since a pair of blow cavity molds are opened unsymmetrically with respect to the blow molding center, the preforms cannot be transferred to the blow molds when the row pitch is P1 that is employed during injection molding. If the preforms are transferred to the blow molds in a state in which the row pitch is set to the maximum pitch P2, it is difficult to design the layout of the apparatus due to an increase in transfer path of the preforms. Moreover, the size of the apparatus necessarily increases. If the preforms are transferred to the blow molds in a state in which the row pitch is set to the maximum pitch P2, the blow molds cannot be closed to the standby position in advance until the preform transfer operation is completed. Since the pitch change motion (operation) is performed in the blow molding station, it is important to reduce the operation time in order to complete the entire operation within one cycle. According to one aspect of the invention, the above problems can be solved by setting the row pitch of the N rows of holding plates that hold the plurality of preforms that are transferred to the N rows of open blow molds to P3.

The blow molding apparatus may further comprise:

an ejection station that is disposed on a downstream side of the blow molding station in the transfer direction, and ejects the plurality of containers from the N rows of holding plates, the row pitch change section may include a P2-P1 pitch change section, the P2-P1 pitch change section being provided in the ejection station, and may change the row pitch of the N rows of holding plates from P2 to P1 before the ejection station ejects the plurality of containers from the N rows of holding plates.

According to the above configuration, the installation space of an ejection member such as a driving cylinder can be reduced. Moreover, since it is unnecessary to return the row pitch from P2 to P1 in the injection molding station that requires the longest molding time, a sufficient injection cycle time can be effectively provided.

In the blow molding apparatus, each of the N rows of holding plates may include a pair of split plates, each of the plurality of neck molds may include a pair of neck split molds that are secured on the pair of split plates, the plurality of containers may be ejected by increasing an interval between the pair of split plates, and the ejection station may eject the plurality of containers sequentially from the N rows of holding plates that are disposed at the row pitch P1.

According to the above configuration, interference can be prevented even if a plurality of holding plates that are adjacent to each other at the minimum pitch P1 interfere with each other when the containers are ejected at the same time. Moreover, since a single ejection operation of the ejection station can be completed within a short time, a plurality of ejection operations can be completed within one cycle.

In the blow molding apparatus, each of the N rows of blow molds may include a pair of blow cavity split molds, a row pitch of the N rows of blow molds may be P1 when the N rows of blow molds are closed, the row pitch of the N rows of holding plates may be set to P1 when the N rows of blow molds are closed, the pair of blow cavity split molds in at least one row among the N rows may be disposed at unsymmetrical positions with respect to a blow molding centerline when the N rows of blow molds are closed, and the row pitch of the N rows of blow molds may be P2 when the N rows of blow molds are opened, the plurality of preforms may be transferred to a space between the pair of blow cavity split molds of each of the N rows of blow molds in a state in which the row pitch of the N rows of blow molds is set to be larger than P3, and the row pitch of the N rows of holding plates is set to P3, the row pitch of the N rows of holding plates may be set to P2 when the row pitch of the N rows of blow molds is set to P2, and the plurality of containers may be transferred from the space between the pair of blow cavity split molds of each of the N rows of blow molds.

When the pair of blow cavity split molds in at least one row among the N rows of blow molds are disposed at unsymmetrical positions with respect to the blow molding centerline when the N rows of blow molds are closed, the row pitch P2 of the N rows of blow molds when the N rows of blow molds are opened is necessarily larger than the row pitch P2 of the N rows of blow molds when the N rows of blow molds are closed. The transfer path of the preforms and the closing time of the blow molds can be reduced by transferring the preforms to the N rows of blow molds while setting the row pitch of the N rows of holding plates to P3 (<P2) instead of the maximum pitch P2.

In the blow molding apparatus,

N may be 2, two blow cavity split molds among the pairs of blow cavity split molds of the two rows of blow molds that are adjacent to each other in a row direction may be secured on a back side, and two blow cavity split molds among the pairs of blow cavity split molds of the two rows of blow molds that are disposed on an outer side in the row direction may be driven, so that the row pitch of the two rows of blow molds is set to P2 when the two rows of blow molds are opened.

In this case, since the pair of open blow cavity split molds are disposed at unsymmetrical positions with respect to the blow molding centerline when the blow molds are closed, it is effective to set the row pitch to P3.

In the blow molding apparatus,

N may be 3, an outermost blow cavity split mold may be secured on a mold closing plate, the outermost blow cavity split mold may be one of the pair of blow cavity split molds of each of two outer blow molds among the three rows of blow molds, the other of the pair of blow cavity split molds of each of the two outer blow molds may be respectively secured on the pair of blow cavity split molds of a center blow mold among the three rows of blow molds on a back side, the three rows of blow molds may close contact with each other in the row direction, and the row pitch of the three rows of blow molds may be P1 when the three rows of blow molds are closed, the pair of blow cavity split molds of the center blow mold may be driven line-symmetrically with respect to the blow molding centerline, the pair of blow cavity split molds of each of the two outer blow molds may be disposed at unsymmetrical positions with respect to the blow molding centerline, and the row pitch of the three rows of blow molds may be P2 when the three rows of blow molds are opened.

In this case, since the pair of open blow cavity split molds are disposed at unsymmetrical positions with respect to the blow molding centerline when the blow molds are closed, it is effective to set the row pitch to P3.

In the blow molding apparatus, the temperature control station may perform the temperature control operation by preliminary blow-molding the plurality of preforms in the N rows of temperature-controlled pot molds so that a body of the plurality of preforms that have been preliminary blow-molded comes in contact with a heated inner wall surface of the N rows of temperature-controlled pot molds.

In this case, since the diameter of the body of the preforms increases as compared with that during injection molding, it is effective to set the row pitch to P3 during the unsymmetrical drive operation.

In the blow molding apparatus, the row pitch change section may include a P3-P1 pitch change section, the P3-P1 pitch change section may be provided in the blow molding station, and may reduce the row pitch of the N rows of holding plates that hold the plurality of preforms from P3 to P1 in synchronization with a closing motion of the N rows of blow molds.

Since the row pitch of the N rows of holding plates can be changed in synchronization with the closing motion of the N rows of blow molds, a situation in which the preforms that have not been blow-molded are damaged due to the mold closing motion can be prevented.

In the blow molding apparatus, the row pitch change section may include a P1-P2 pitch change section, the P1-P2 pitch change section may be provided in the blow molding station, and may increase the row pitch of the N rows of holding plates that hold the plurality of containers from P1 to P2 in synchronization with an opening motion of the N rows of blow molds.

Since the row pitch of the N rows of holding plates that hold the plurality of containers can be changed in synchronization with the opening motion of the N rows of blow molds, a situation in which the containers are damaged due to the mold opening motion can be prevented.

In the blow molding apparatus, the row pitch change section may include a P1-P3 pitch change section, the P1-P3 pitch change section may be provided in the temperature control station, and may increase the row pitch of the N rows of holding plates that hold the plurality of preforms from P1 to P3.

The row pitch is changed to P3 after the temperature control step, but before the plurality of preforms are transferred to the N rows of open blow molds. Since another pitch change operation is required in the blow molding station, it is preferable to change the row pitch in the temperature control station. This also contributes to a reduction in the transfer path of the preforms.

In the blow molding apparatus, the support-transfer member may include a row pitch-keeping member that keeps the row pitch of the N rows of holding plates to P1, P2, or P3, the N rows of holding plates may include a row pitch change link mechanism that changes the row pitch, the row pitch change link mechanism may include a guide rod that is supported by the support-transfer member and moved when changing the row pitch, the guide rod may include three engagement sections that are spaced along a moving direction, and the row pitch-keeping member may include an engagement section that elastically engages one of the three engagement sections.

This makes it possible to reliably keep the row pitch to P1, P2, or P3 even during the transfer operation or the like.

According to another embodiment of the invention, there is provided a blow molding apparatus comprising:

N (N is an integer equal to or larger than 2) rows of holding plates;

N rows of blow molds that blow-mold a plurality of preforms held by the N rows of holding plates into a plurality of containers;

a mold closing/opening device that closes/opens the N rows of blow molds; and a row pitch change section that changes a row pitch of the N rows of holding plates, each of the N rows of blow molds including a pair of blow cavity split molds, a row pitch of the N rows of blow molds being P1 when the N rows of blow molds are closed, the row pitch of the N rows of holding plates being set to P1 when the N rows of blow molds are closed, the pair of blow cavity split molds in at least one row among the N rows being disposed at unsymmetrical positions with respect to a blow molding centerline when the N rows of blow molds are closed, the row pitch of the N rows of blow molds being P2 (P2>P1) when the N rows of blow molds are opened, the mold closing/opening device including two mold closing/opening sections that close/open two blow cavity split molds of the N rows of blow molds that are positioned on an outer side in a row direction, and a split mold synchronization member that engages and moves the two blow cavity split molds in synchronization, and being formed without using a tie rod, and the row pitch change section engaging the split mold synchronization member that is displaced corresponding to synchronization movement of the two blow cavity split molds, and changing the row pitch of the two rows of holding plates in synchronization with movement of the two blow cavity split molds.

According to this aspect of the invention, since the mold closing/opening device can be formed without using a tie rod, the blow molds can be installed and removed in the horizontal direction through the side of the blow molding apparatus. Moreover, the blow cavity split molds positioned on the outermost side can be moved in synchronization using the split mold synchronization member while independently driving the blow cavity split molds using the mold closing/opening sections. It is also possible to change the row pitch of the N rows of holding plates by utilizing the displacement of the split mold synchronization member, and change the row pitch of the N rows of holding plates in synchronization with the movement of the blow cavity split molds.

According to another embodiment of the invention, there is provided a blow molding apparatus comprising:

N rows of holding plates, each of the N rows of holding plates holding a plurality of neck molds;

a support-transfer member that transfers the N rows of holding plates, the support-transfer member supporting the N rows of holding plates so that a row pitch of the N rows of holding plates can be changed;

an injection molding station that injection-molds a plurality of preforms, the injection molding station including N rows of injection cavity molds that are clamped to the plurality of neck molds that are held by each of the N rows of holding plates; and a blow molding station that includes N rows of blow molds, and blow-molds the plurality of preforms held by the N rows of holding plates into a plurality of containers, the support-transfer member including:

two rail members that are disposed on either end of the N rows of holding plates in a longitudinal direction;

at least one reinforcement shaft that is provided along a row direction of the N rows of holding plates; and two first securing sections that secure either end of the at least one reinforcement shaft, each of the N rows of holding plates including two guide members that are guided along the two rail members, and support the N rows of holding plates so that the row pitch of the N rows of holding plates can be changed, and each of the N rows of holding plates having at least one first through-hole that receives the at least one reinforcement shaft.

If the N rows of holding plates are supported by the guide members on only the ends in the longitudinal direction, the N rows of holding plates may flex in the intermediate area in the longitudinal direction. According to the above configuration, at least one first through-hole is formed in each of the N rows of holding plates in the intermediate area in the longitudinal direction. At least one reinforcement shaft is inserted into the first through-hole, and the ends of the at least one reinforcement shaft are secured using the first securing sections. The at least one reinforcement shaft thus suppresses flexure of the N rows of holding plates. Therefore, the preforms (containers) can be molded at a uniform height using the neck molds held by the N rows of holding plates independently of the position of each holding plate in the longitudinal direction, so that uniform molding quality can be achieved.

In the blow molding apparatus, the support-transfer member may further include a second securing section that secures an intermediate part of the at least one reinforcement shaft at a position between the N rows of holding plates.

Since flexure of the reinforcement shaft is suppressed by the second securing section, flexure of the N rows of holding plates can be further suppressed.

In the blow molding apparatus, each of the N rows of holding plates may include a pair of split plates, each of the plurality of neck molds may include a pair of neck split molds that are secured on the pair of split plates, the plurality of containers may be ejected from the plurality of neck molds by increasing an interval between the pair of split plates, and one of the pair of split plates of each of the N rows of holding plates may have a depression at a position opposite to the second securing section.

When the containers are ejected by increasing the interval between the pair of split plates, the split plates of the N rows of holding plates may almost come in contact with each other. In this case, since at least part of the second securing section is disposed within the depression, a situation in which the second securing section interferes with the split plate can be prevented.

In the blow molding apparatus, each of the N rows of holding plates may include:

two second through-holes that are formed in the row direction at a plurality of positions in the longitudinal direction;

two guide shafts that are respectively inserted into the two second through-holes; and two biasing members that are respectively inserted into the two guide shafts, and bias the pair of split plates in a closing direction, and the at least one reinforcement shaft may be disposed between the two guide shafts in the longitudinal direction.

According to the above configuration, the N rows of holding plates are supported by the guide members on each end in the longitudinal direction, supported by the guide shafts in the inward position, and supported by the at least one reinforcement shaft in a further inward position. This makes it possible to suppress flexure of the N rows of holding plates over the entire area in the longitudinal direction. It is preferable to provide the guide shafts that support the biasing members at remote positions in the longitudinal direction since a biasing force that biases the pair of split plates in the closing direction can be applied over the entire area in the longitudinal direction.

In the blow molding apparatus, the plurality of neck molds may be closed after the support-transfer member has been moved downward in the blow molding station, and the blow molding station may include a plurality of stoppers that come in contact with the support-transfer member that has been moved downward to specify a lower limit position of the support-transfer member at a position between the N rows of holding plates.

The N rows of holding plates may flex due to flexure of the support-transfer member that supports the N rows of holding plates. The plurality of stoppers provided in the blow molding station come in contact with the support-transfer member that has been moved downward at a position between the N rows of holding plates, so that flexure of the support-transfer member can be suppressed.

Exemplary embodiments of the invention are described in detail below. Note that the following exemplary embodiments do not in any way limit the scope of the invention defined by the claims laid out herein, and all of the elements of the following exemplary embodiments should not necessarily be taken as essential elements of the invention.

1. Molding Process Performed by Blow Molding Apparatus, and Row Pitch

FIG. 1 is a schematic view illustrating four main steps performed by a rotary transfer blow molding apparatus according to one embodiment of the invention. The four main steps include an injection molding step, a temperature control step, a blow molding step, and an ejection step. A rotary transfer blow molding apparatus 10 shown in FIG. 1 includes an injection molding station 12, a temperature control station 14, a blow molding station 16, and an ejection station 18, the injection molding station 12, the temperature control station 14, the blow molding station 16, and the ejection station 18 being respectively provided in regions obtained by equally dividing a transfer region (360°) into four regions. The rotary transfer blow molding apparatus 10 also includes four transfer plates (i.e., support-transfer members) 20A to 20D that are intermittently transferred (rotated) to the injection molding station 12, the temperature control station 14, the blow molding station 16, and the ejection station 18. FIG. 1 illustrates a state in which the transfer plate 20A is intermittently transferred to the injection molding station 12, the temperature control station 14, the blow molding station 16, and the ejection station 18.

Each of the transfer plates 20A to 20D supports N (N is an integer equal to or larger than 2) rows (e.g., two rows) of holding plates 30 (not shown in FIG. 1; see FIGS. 2 to 8) that respectively hold a molded article 1 (preform 1A, preliminarily blow-molded preform 1B, or container 1C) so that the row pitch can be changed to P1, P2, or P3 (P1<P3<P2). For example, P1=190 mm, P2=290 mm, and P3=210 mm.

FIGS. 2 to 8 show the row pitch of the two rows of holding plates 30 employed in each step. Note that the two rows of holding plates 30 are supported by the transfer plate 20 (20A to 20D) so as to be slidable in the row direction (see FIG. 2 of JP-B-8-13501).

In the injection molding station 12 (see FIG. 2), a plurality of (twelve in FIG. 1) preforms 1A are injection-molded using N rows of injection cavity molds 40, neck molds 42 that are respectively held by the N rows of holding plates 30, and injection core molds (not shown). The row pitch during injection molding is set to the minimum pitch P1. Note that the transfer plate 20A is moved downward to a height H2 during injection molding, and clamps the neck molds 42 held by the transfer plate 20A to the two rows of injection cavity molds 40, the height H2 being lower than a height H1 of the transfer plate 20A during transfer by a distance L. The transfer plate 20A is moved upward after the preforms 1A have been injection-molded, so that the preforms 1A held by the neck molds 42 are removed from the injection cavity molds 40. The injection core molds (not shown) are also moved upward, and removed from the preforms 1A. The preforms 1A held by the neck molds 42 are then transferred to the temperature control station 14 by rotating the transfer plate 20A.

In the temperature control station 14 (see FIG. 3) that is disposed on the downstream side of the injection molding station 12 in the transfer direction, the body of the preforms 1A is caused to come in contact with the heated inner wall surface of N rows of temperature-controlled pot molds 50 so that the preforms 1A are heated to an optimum blow temperature. In one embodiment of the invention, the preforms 1A are preliminarily blow-molded in the N rows of temperature-controlled pot molds 50, and the preliminarily blow-molded preforms (1B) are caused to come in contact with the inner wall surface of the N rows of temperature-controlled pot molds 50. The body of the preliminarily blow-molded preforms 1B is thus increased in diameter (see FIG. 4), and heated to an optimum blow temperature. The row pitch of the N rows of holding plates 30 in the temperature control step is set to P1, for example. In this case, the row pitch of the N rows of temperature-controlled pot molds 50 is also set to P1. Alternatively, the row pitch of the N rows of temperature-controlled pot molds 50 may be set to the intermediate pitch P3 (P1<P3<P2), and the row pitch of the N rows of holding plates 30 may also be set to the intermediate pitch P3 in the temperature control step. Note that the N rows of temperature-controlled pot molds 50 can be moved upward and downward, and are set at the upward position in the temperature control step. The temperature-controlled pot mold 50 used to preliminarily blow-mold the preform includes a pair of temperature-controlled pot split molds 52A and 52B that can be opened and closed. A temperature-controlled core may be used in the temperature control step. Note that the preform need not necessarily be preliminarily blow-molded, as described later.

When transferring the preliminarily blow-molded preforms 1B, the row pitch of the N rows of holding plates 30 is set to the intermediate pitch P3 (P3<P1) (see FIG. 4) taking account of the blow molding step.

Figure 5:
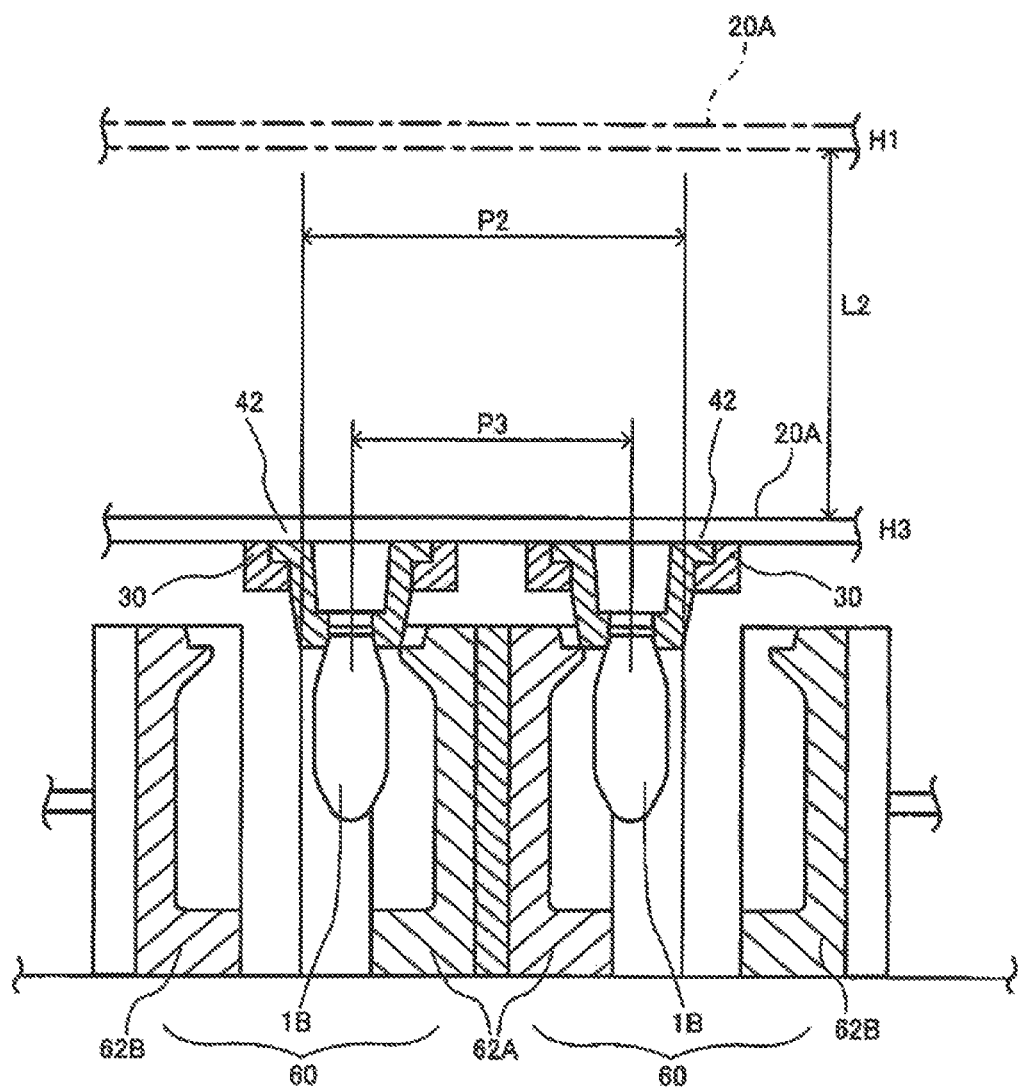
FIG. 5 is a view showing a process that transfers two rows of preforms disposed at a row pitch P3 to blow molds.
Figure 6:
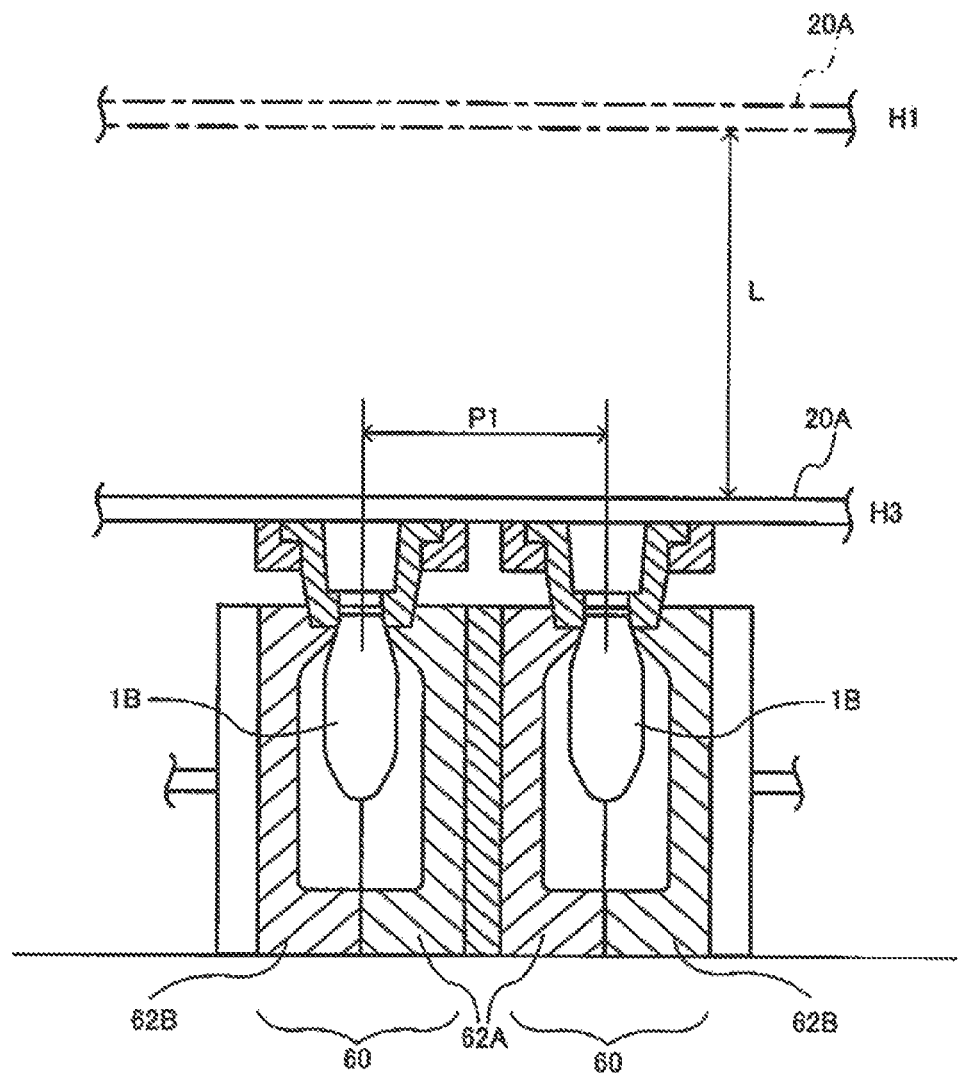
FIG. 6 is a view showing a process that closes blow molds (row pitch: P1).
Figure 7:
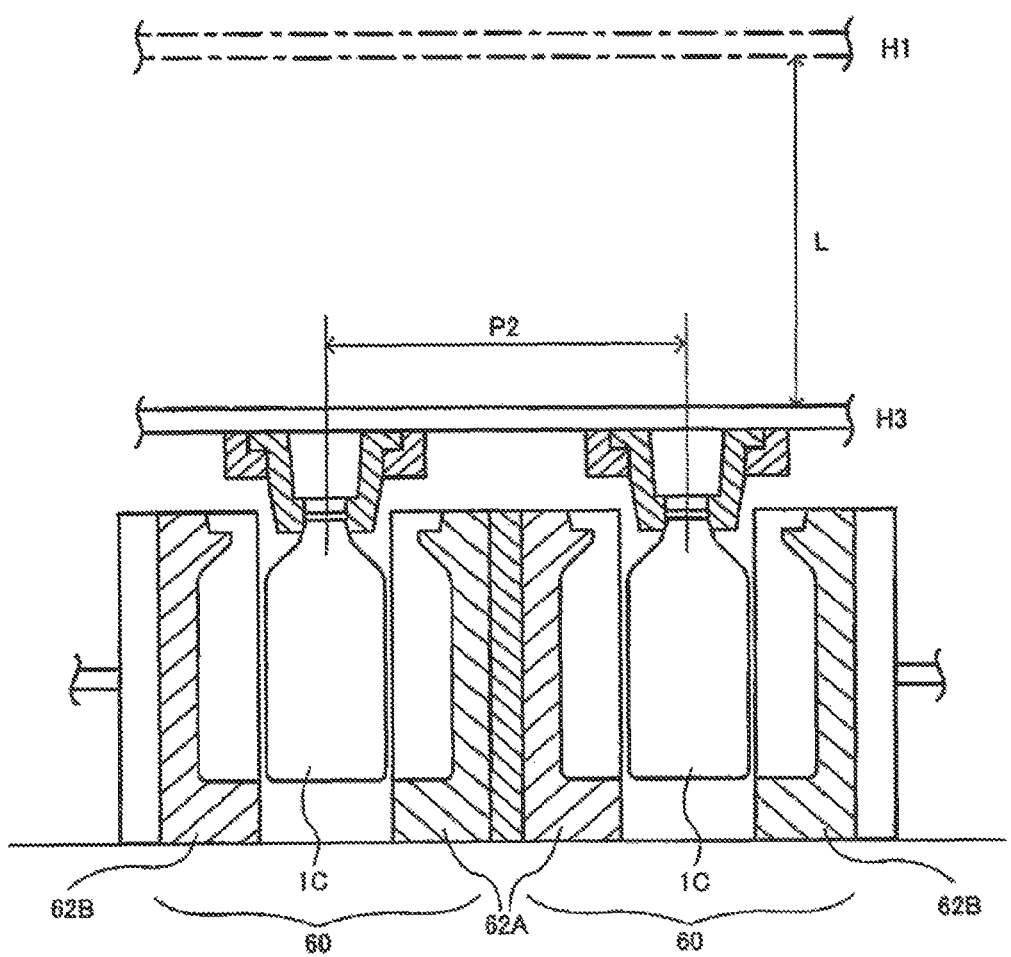
FIG. 7 is a view showing a process that opens blow molds (row pitch: P2).

As shown in FIGS. 5 to 7, the blow molding station 16 that is disposed on the downstream side of the temperature control station 14 in the transfer direction includes N rows of blow molds 60. In the blow molding station 16, the preliminarily blow-molded preforms 1B are blow-molded into a plurality of containers 1C in the N rows of blow molds 60 that are closed (see FIG. 6). In the blow molding step, the transfer plate 20A is moved downward to a height H3 in the same manner as in the injection molding step.

Each of the N rows of blow molds 60 includes a pair of blow cavity split molds 62A and 62B. The blow cavity split molds 62A that are adjacent to each other in the row direction are secured on the back side, and the blow cavity split molds 62B that are disposed on the outer side in the row direction are closed/opened. The row pitch of the N rows of blow molds is set to P2 when the blow cavity split molds 62B that are disposed on the outer side in the row direction have been opened (see FIGS. 5 and 7). Specifically, the blow cavity split molds 62A and 62B are disposed at unsymmetrical positions with respect to the blow molding centerlines (i.e., the vertical lines that indicate the pitch P3 in FIG. 5) when the blow cavity split mold 62B is opened (see FIG. 5).

The row pitch of the N rows of holding plates 30 is set to P3 in a state in which the N rows of blow molds 60 are opened, and the preliminarily blow-molded preform 1B is transferred to the space between the pair of blow cavity split molds 62A and 62B of each of the N rows of blow molds 60. If the row pitch of the N rows of holding plates 30 is set to P1 (P1<P3), the preliminarily blow-molded preform 1B interferes with the blow cavity split mold 62A when the preform 1B is transferred to the space between the pair of blow cavity split molds 62A and 62B. If the row pitch of the N rows of holding plates 30 is set to the maximum pitch P2 (see JP-B-6-49331 and JP-B-8-13501), interference with another member may occur, or space-saving may not be implemented due to an increase in the radius of rotation.

The row pitch of the N rows of holding plates 30 may be set to P3 before starting the temperature control step in order to prevent interference. In this case, the row pitch of the N rows of temperature-controlled pot molds 50 is set to P3. It suffices that the row pitch of the N rows of holding plates 30 be set to P3 in a state in which the preforms 1B are held by the N rows of holding plates 30 so that interference with the N rows of blow molds 60 can be prevented. In FIG. 5, the preliminarily blow-molded preforms 1B are transferred to the N rows of blow molds 60 that are set at the row pitch P2. Note that another configuration may also be employed (see FIGS. 16 and 17). The blow cavity split mold 62B may be closed in advance to a position at which the blow cavity split mold 62B does not interfere with the preliminarily blow-molded preform 1B. This makes it possible to have enough time for the blow molding operation within one cycle.

The N rows of blow molds 60 are closed after the transfer operation shown in FIG. 5, and the row pitch of the N rows of blow molds 60 is set to P1 (see FIG. 6). The row pitch of the N rows of holding plates 30 is also set to P1. In this case, the row pitch of the N rows of holding plates 30 may be changed in synchronization with the closing motion of the N rows of blow molds 60. The blow molding step is implemented by introducing high-pressure air into the preliminarily blow-molded preforms 1B from a blow core mold while moving a stretching rod in the vertical direction.

The N rows of blow molds 60 are opened after the blow molding operation, and the row pitch of the N rows of blow molds 60 is set to P2 (see FIG. 7). The row pitch of the N rows of holding plates 30 is also set to P2, and the containers C are removed from the blow cavity split molds 62A and 62B of the N rows of blow molds 60. The row pitch of the N rows of holding plates 30 may be changed in synchronization with the opening motion of the N rows of blow molds 60.

The transfer plate 20A is then moved upward, and rotated to transfer the N rows of containers C1 (row pitch: P2).

Figure 8:
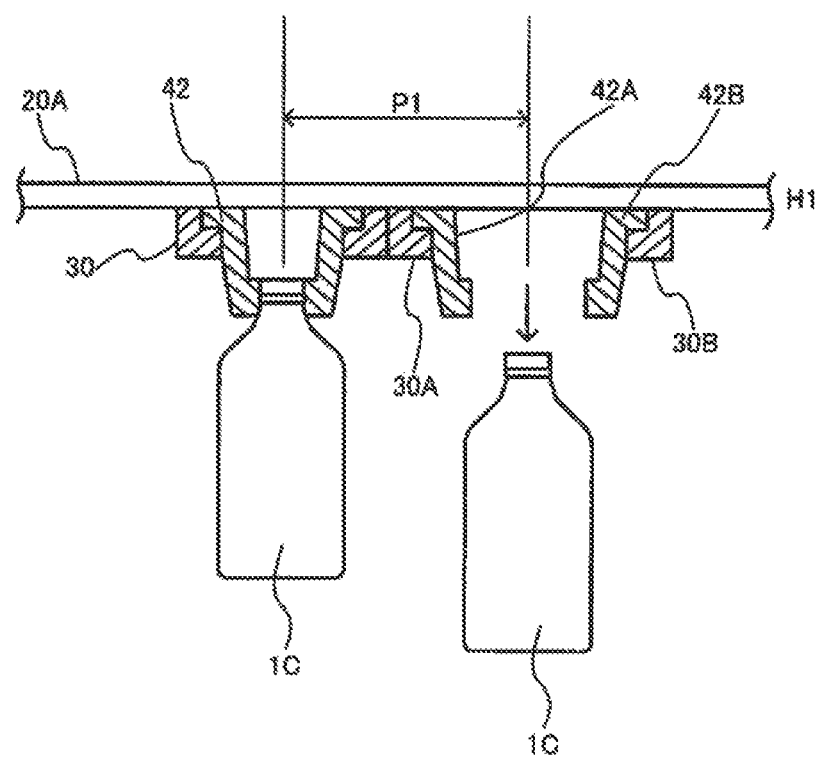
FIG. 8 is a view showing a sequential ejection step (row pitch: P1).

In the ejection station 18, the row pitch of the N rows of holding plates 30 is set to P1 (see FIG. 8). Each of the N rows of holding plates 30 includes a pair of split plates 30A and 30B, and the neck mold 42 includes a pair of neck split molds 42A and 42B that are respectively secured on the split plates 30A and 30B. The container 1C can be ejected by opening the pair of neck split molds 42A and 42B by a known method (see FIG. 8). The opening/closing stroke of the N rows of holding plates 30 can be provided even when the row pitch of the N rows of holding plates 30 is small (P1) by sequentially opening the N rows of holding plates 30 (see FIG. 8).

Figure 9:
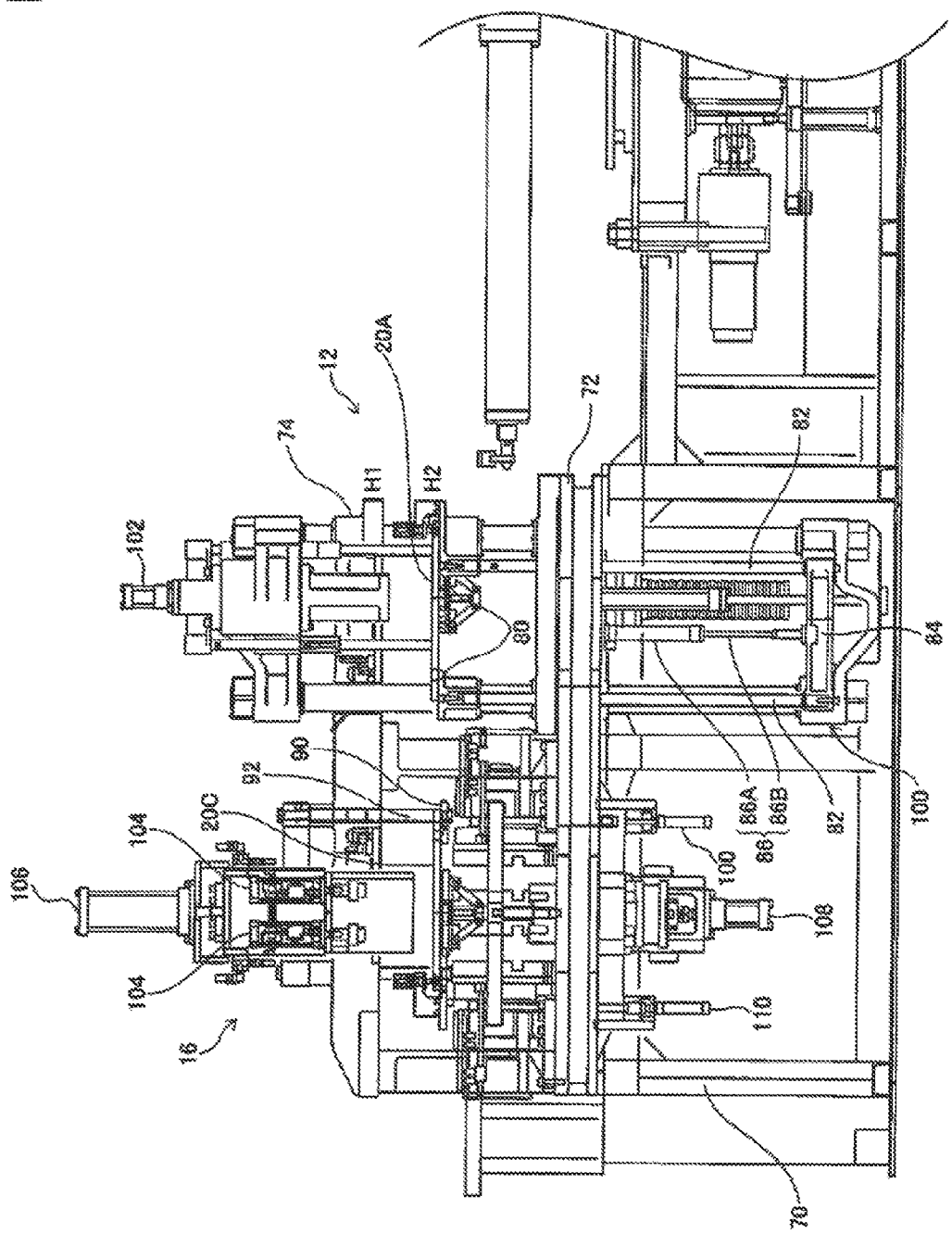
FIG. 9 is a front view showing a rotary transfer blow molding apparatus according to one embodiment of the invention.

2. Blow Molding Apparatus 2.1. Outline of Injection Molding Station and Blow Molding Station FIG. 9 is a front view showing the blow molding apparatus in which the molds are not installed. A lower base 72 is secured on a stage 70, and an upper base 74 is secured above the lower base 72. FIG. 9 shows the injection molding station 12 and the blow molding station 16. In the injection molding station 12 and the blow molding station 16 shown in FIG. 9, the transfer plates 20A and 20C have been moved downward to the height H2 or H3 (see FIGS. 2 and 5 to 7). In the injection molding station 12, the injection cavity molds 40 (see FIG. 2) are disposed on the lower base 72. In the blow molding station 16, the blow molds 60 (see FIGS. 5 to 7) are disposed on the lower base 72. The following description is given taking an example in which the transfer plate 20A is positioned in the injection molding station 12, the transfer plate 20B is positioned in the temperature control station 14, the transfer plate 20C is positioned in the blow molding station 16, and the transfer plate 20D is positioned in the ejection station 18.

A plurality of driving rods 82 that are used to move the transfer plate 20A upward and downward are provided in the injection molding station 12, the plurality of driving rods 82 extending downward from a receiving member 80 that holds the transfer plate 20A so that the transfer plate 20A can be rotated and moved upward and downward. The lower ends of the plurality of driving rods 82 are connected via a connection member 84. The transfer plate 20A is moved upward and downward by a transfer plate driver section 86 that includes a cylinder 86A that is secured on the lower base 72, and a rod 86B that is secured on the connection member 84.

A plurality of driving rods 92 that are used to move the transfer plate 20C upward and downward are provided in the blow molding station 16, the plurality of driving rods 92 extending upward from a receiving member 90 that holds the transfer plate 20C so that the transfer plate 20C can be rotated and moved upward and downward. A transfer plate driver section (not shown in FIG. 9) that moves the plurality of driving rods 92 upward and downward via a connection member is provided on the upper base 74.

A vertical mold-closing device 100, an injection core-removing section 102, and the like are also provided in the injection molding station 12. A stretching rod driver section 104, a blow core driver section 106, a raised-bottom mold driver section 108, a blow pressure-receiving plate driver section 110, and the like are also provided in the blow molding station 16.

The following description focuses on the temperature control station 14, the blow molding station 16, and the ejection station 18 in which the row pitch is changed.

2.2. Temperature Control Station and Row Pitch Change Link Mechanism

Figure 3:
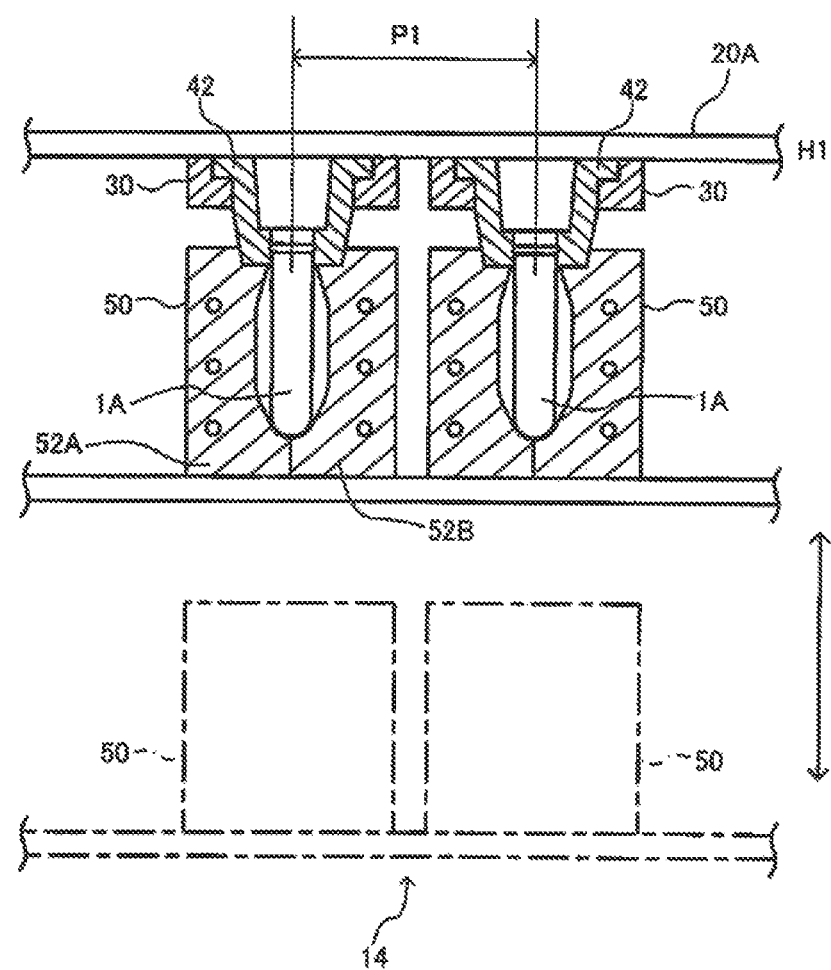
FIG. 3 is a view showing a temperature control step that preliminarily blow-molds two rows of preforms disposed at a row pitch P1.
Figure 4:
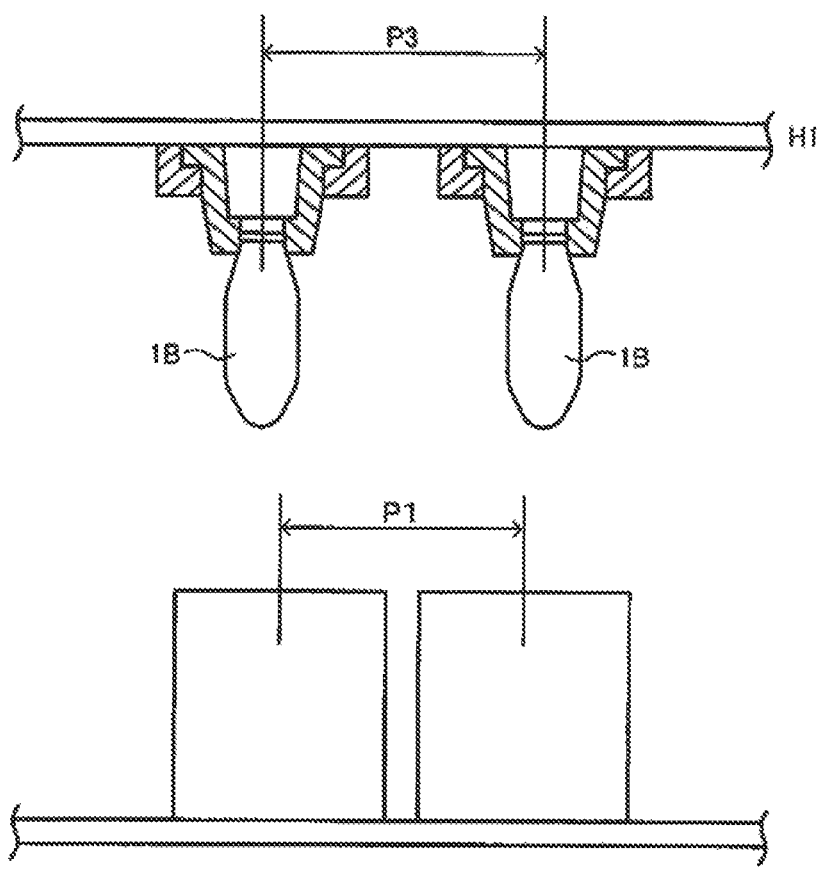
FIG. 4 is a view showing a process that changes the row pitch of two rows of preforms removed from temperature-controlled pot molds from P1 to P3.
Figure 10:
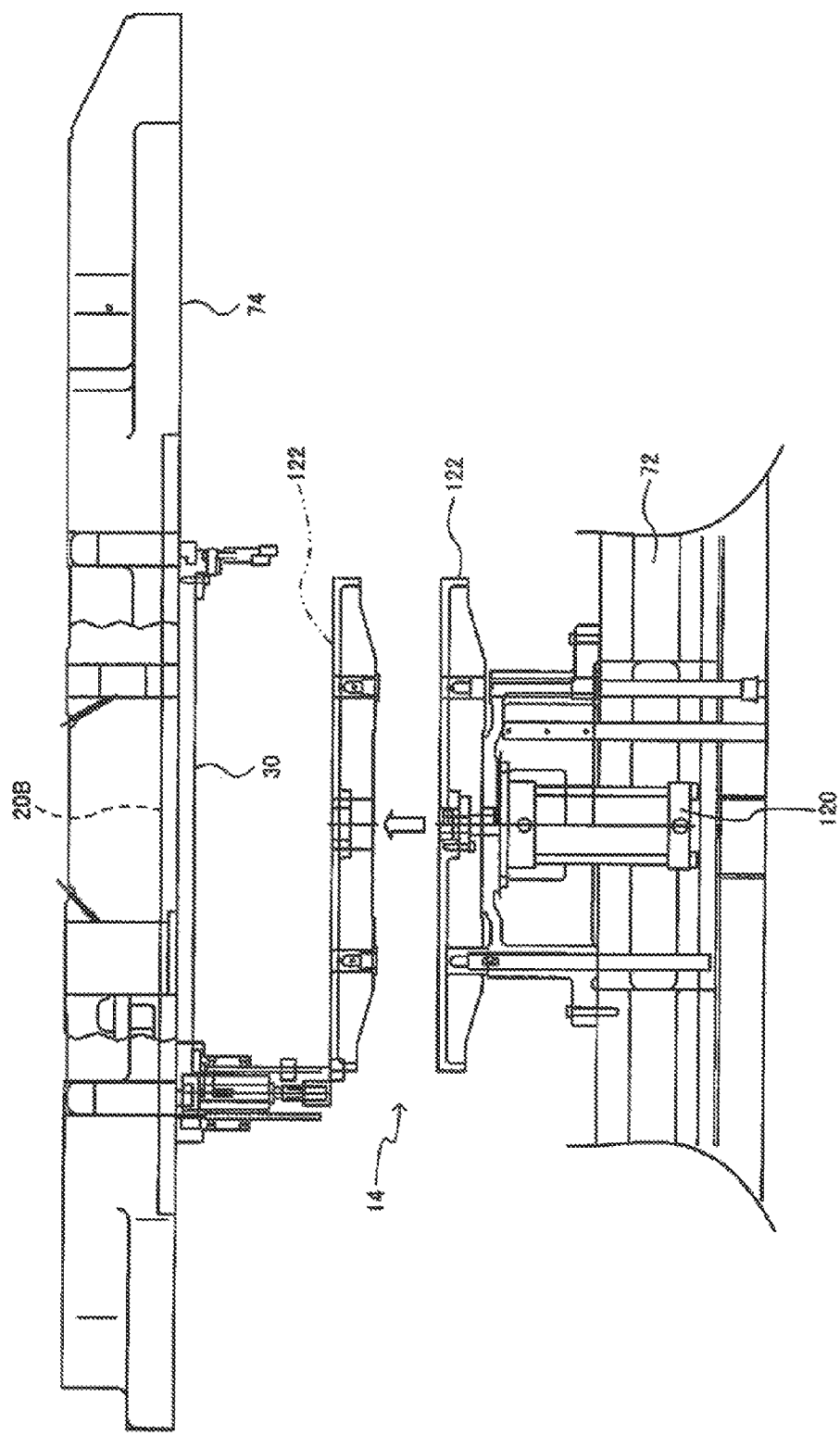
FIG. 10 is a view showing a temperature-controlled pot lift mechanism disposed in a temperature control station.

FIG. 10 shows the temperature control station 14 in a state in which the temperature-controlled pot molds 50 shown in FIG. 3 are not provided. A pot stage 122 that is moved upward and downward by a pot driver section 120 secured on the lower base 72 is disposed in the temperature control station 14. The temperature-controlled pot molds 50 shown in FIG. 3 can be moved upward and downward by the pot driver section 120.

Figure 11:
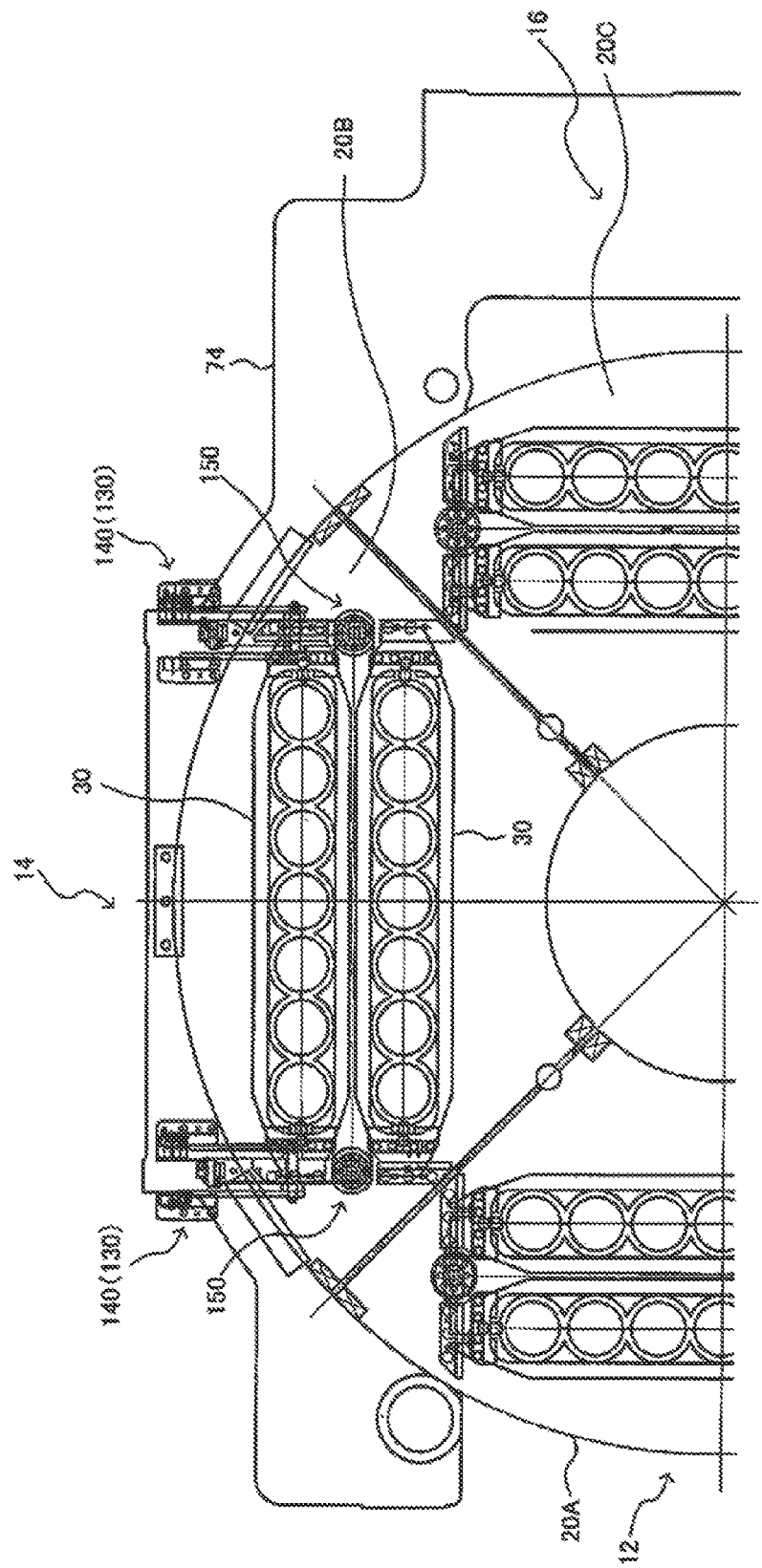
FIG. 11 is a bottom view showing a transfer plate.

FIG. 11 is a bottom view showing the transfer plates 20A to 20C. FIG. 11 shows a state in which the neck mold is not secured on the holding plate 30. A P1-P3 pitch change section 140 (i.e., row pitch change section 130) that changes the row pitch of the two rows of holding plates 30 provided on the transfer plate 20B that has stopped at the temperature control station 14 from P1 to P3 is provided on the upper base 74. The P1-P3 pitch change section 140 may be disposed on each end of the holding plate 30 in the longitudinal direction.

Figure 12:
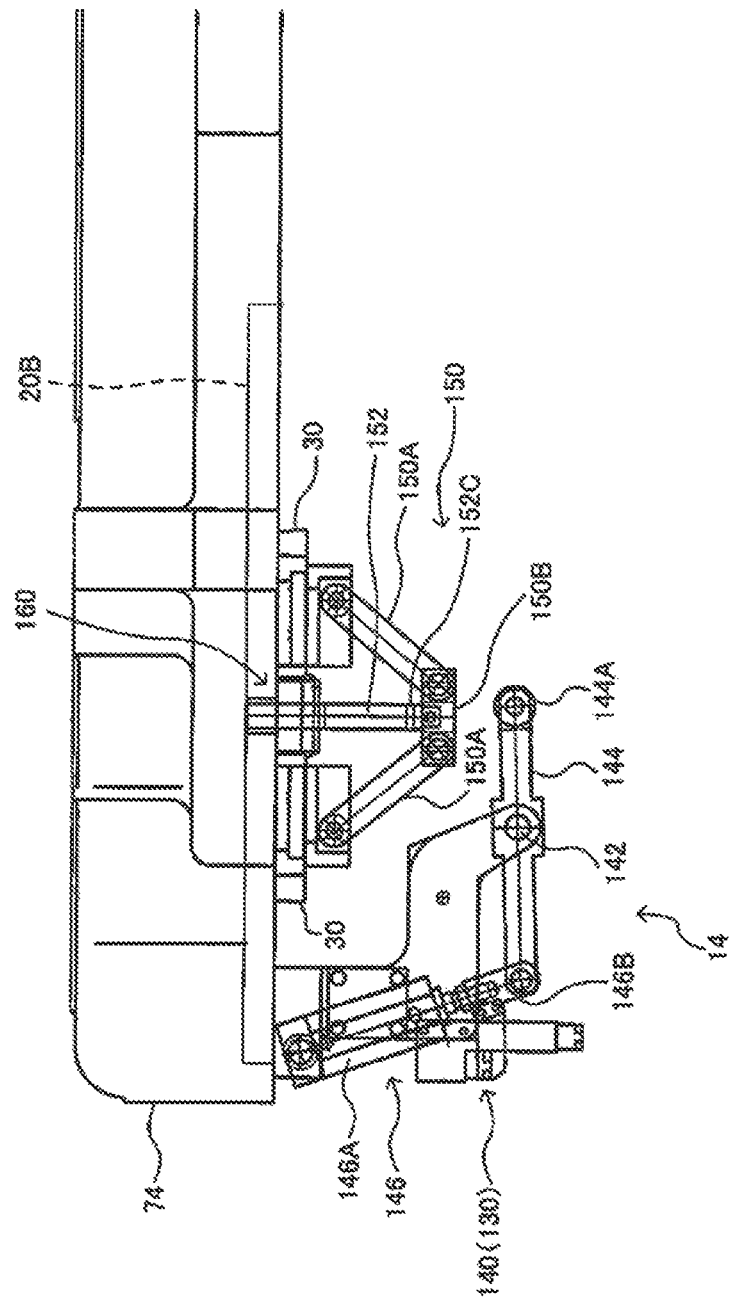
FIG. 12 is a view showing a row pitch change section disposed in a temperature control station.
Figure 13:
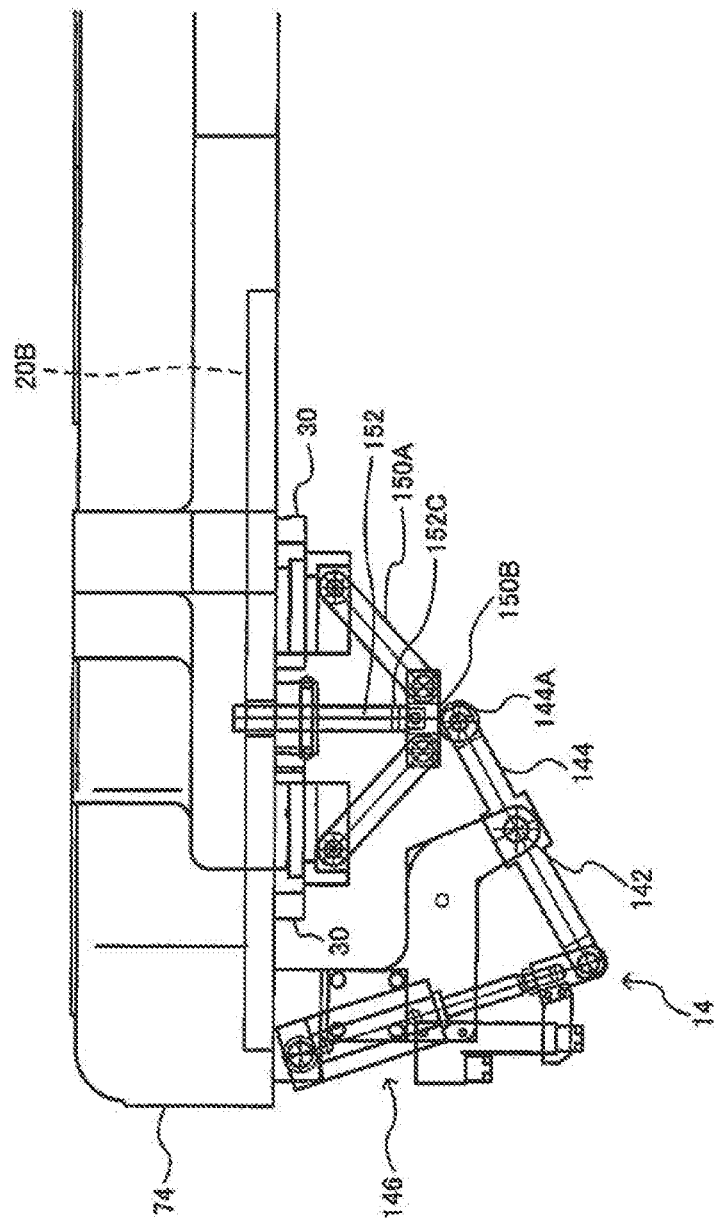
FIG. 13 is a view showing a pitch change operation of a row pitch change section disposed in a temperature control station.

As shown in FIGS. 12 and 13, the P1-P3 pitch change section includes a swing arm 144 that swings around a swing shaft 142 supported by the upper base 74, and an arm driver section 146 that swings the swing arm 144. The arm driver section 146 includes a cylinder 146A that is secured on the upper base 74, and a rod 146B that is connected to one end of the swing arm 144 using a pin or the like. When the rod 146B is extended by the cylinder 146A, the other end (that is provided with a roller 144A, for example) of the swing arm 144 is moved upward.

Figure 14:
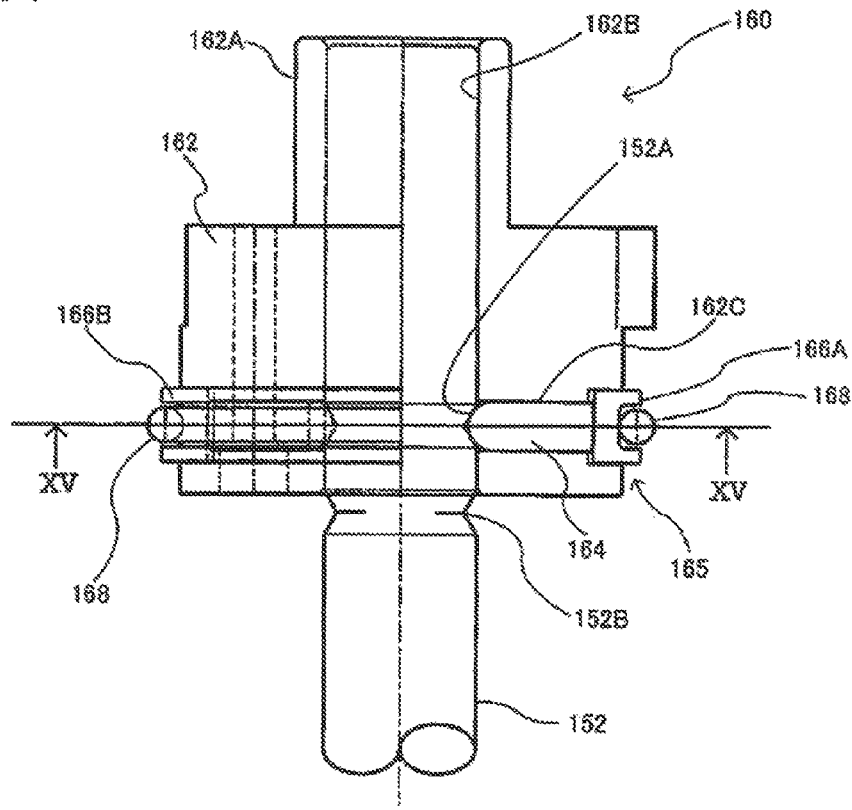
FIG. 14 is a view showing a row pitch-keeping member disposed on a transfer member.

The two rows of holding plates 30 provided on the transfer plate (20A to 20D) are provided with a row pitch change link mechanism 150 that displaces due to the driving force applied by the P1-P3 pitch change section 140 (i.e., row pitch change section 130), and changes the row pitch, the row pitch change link mechanism 150 being provided on each end of the two rows of holding plates 30 in the longitudinal direction. The row pitch change link mechanism 150 includes a pair of first arms 150A, one end of the pair of first arms 150A being rotatably supported by the two rows of holding plates 30, and a link arm 150B that rotatably links the other end of the pair of first arms 150A either eccentrically or coaxially. The row pitch change link mechanism 150 also includes a guide rod 152 that is moved (guided) when changing the row pitch, one end of the guide rod 152 being secured on the link arm 150B, and the other end of the guide rod 152 being supported by the transfer plate 20B. The guide rod 152 includes engagement sections 152A, 152B, and 152C that are spaced along the vertical (moving) direction (the engagement section 152C is shown in FIGS. 12 and 13, and the engagement sections 152A and 152B are shown in FIG. 14). As shown in FIG. 14, the engagement sections 152A, 152B, and 152C are annular grooves formed in the surface of the guide rod 152.

When the P1-P3 pitch change section 140 swings the swing arm 144 from the state shown in FIG. 12 (row pitch: P1) to the state shown in FIG. 13 (row pitch: P3), the roller 144A provided on the end of the swing arm 144 causes the link arm 150B of the row pitch change link mechanism 150 to move upward. The angle formed by the pair of first arms 150A can thus be increased (see FIG. 13), so that the row pitch of the two rows of holding plates 30 can be increased. Since the pair of first arms 150A move line-symmetrically with respect to the guide rod 152 (centerline), the two rows of holding plates 30 also move line-symmetrically with respect to the centerline that perpendicularly intersects the row direction.

Figure 15:
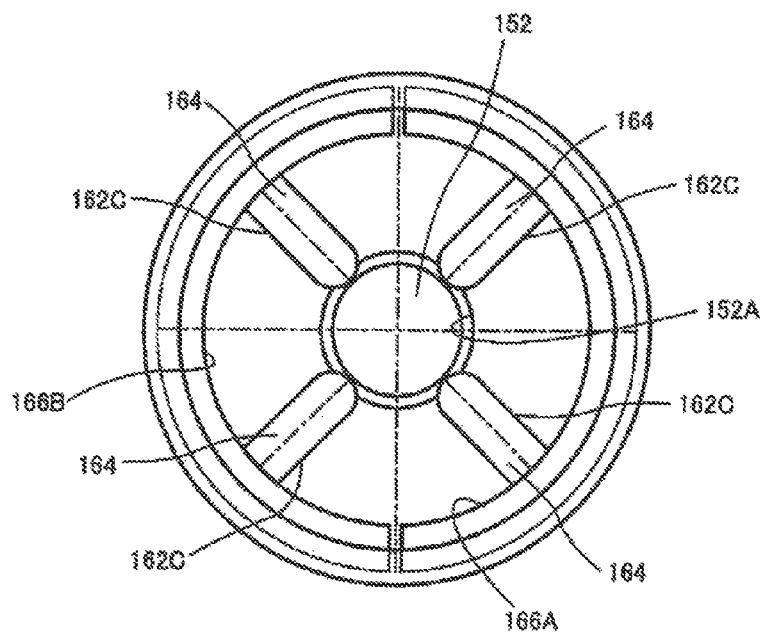
FIG. 15 is a cross-sectional view taken along the line XV-XV in FIG. 14.

The transfer plate 20B may include a row pitch-keeping member 160 that keeps the row pitch of the N rows of holding plates to P1, P2, or P3. As shown in FIG. 14, the row pitch-keeping member 160 includes a guide tubular body 162 that includes a fitting section 162A that is fitted into a hole formed in the transfer plate 20B. A through-hole 162B into which the guide rod 152 is inserted (in which the guide rod 152 is guided) is formed in the guide tubular body 162. As shown in FIG. 15, the through-hole 162B communicates with a plurality of (e.g., four) radial holes 162C. An engagement section 165 that elastically engages one of the engagement sections 152A, 152B, and 152C is supported within each radial hole 162C. The engagement section 165 includes a plunger 164 that is fitted into one of the engagement sections 152A, 152B, and 152C, a pair of split rings 166A and 166B that prevent removal of the plunger 164, and an elastic member (e.g., O-ring 168) that is provided along the pair of split rings 166A and 166B. The plunger 164 may include a spherical body and a shaft. Alternatively, a spherical body may be used instead of the plunger 164, and a biasing member (e.g., coil spring) disposed in the radial hole 162C may be used instead of the O-ring 168. The spherical body and the biasing member that are held within the radial hole 162C may be retained using a bolt, a plunger, or the like.

When the row pitch is P1 (see FIG. 12), the engagement section 165 elastically engages the engagement section 152A (see FIG. 14). Since the height of the guide rod 152 is fixed at this position, the row pitch of the holding plates 30 is kept at P1 by the row pitch change link mechanism 150. When the guide rod 152 has been displaced as shown in FIG. 13 after the temperature control step, the engagement section 165 elastically engages the engagement section 152B (i.e., the row pitch is changed to P2).

2.3. Blow Molding Station

Figure 16:
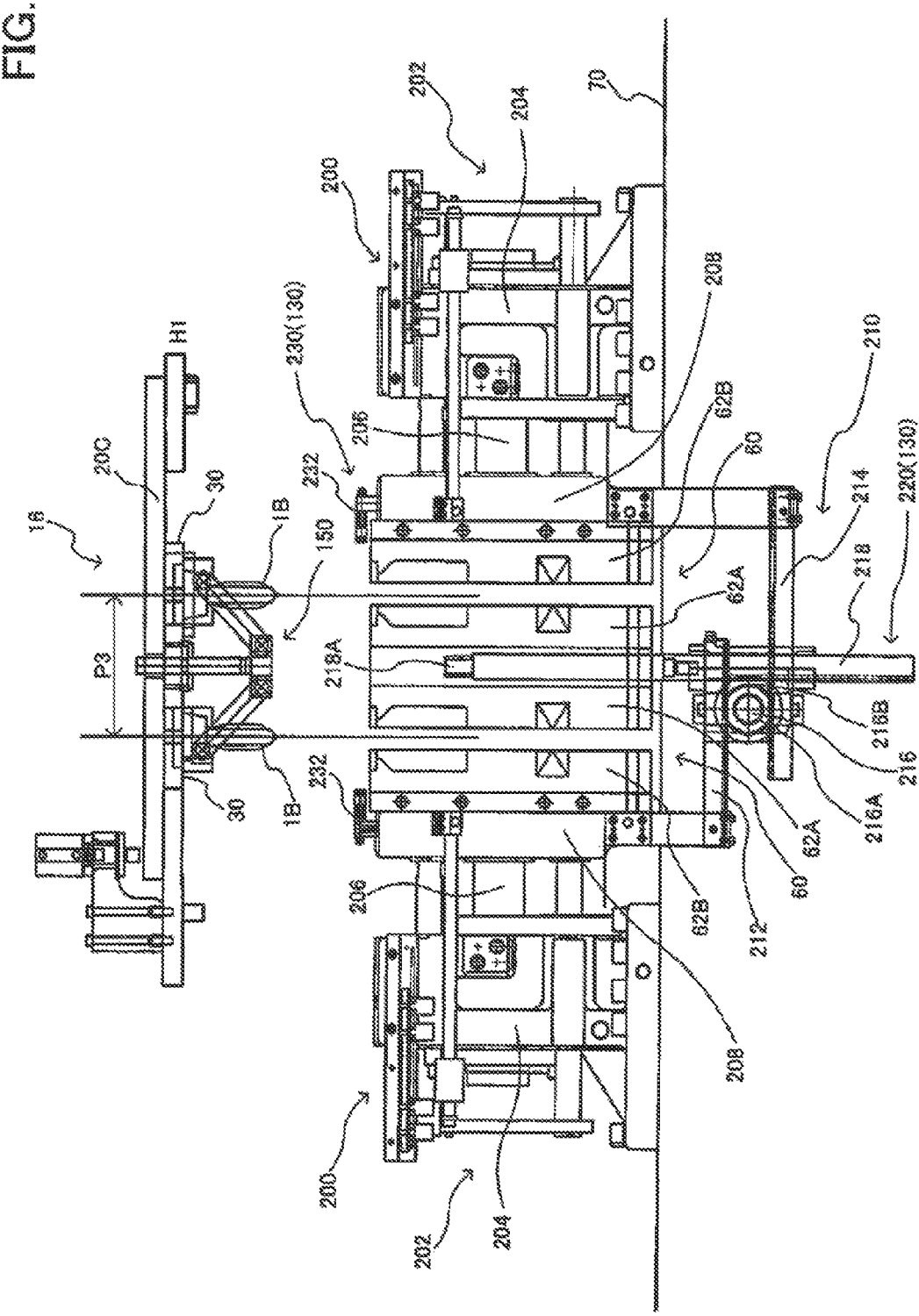
FIG. 16 is a view showing a state in which two rows of preforms disposed at a row pitch P3 have been transferred to a blow molding station.
Figure 17:
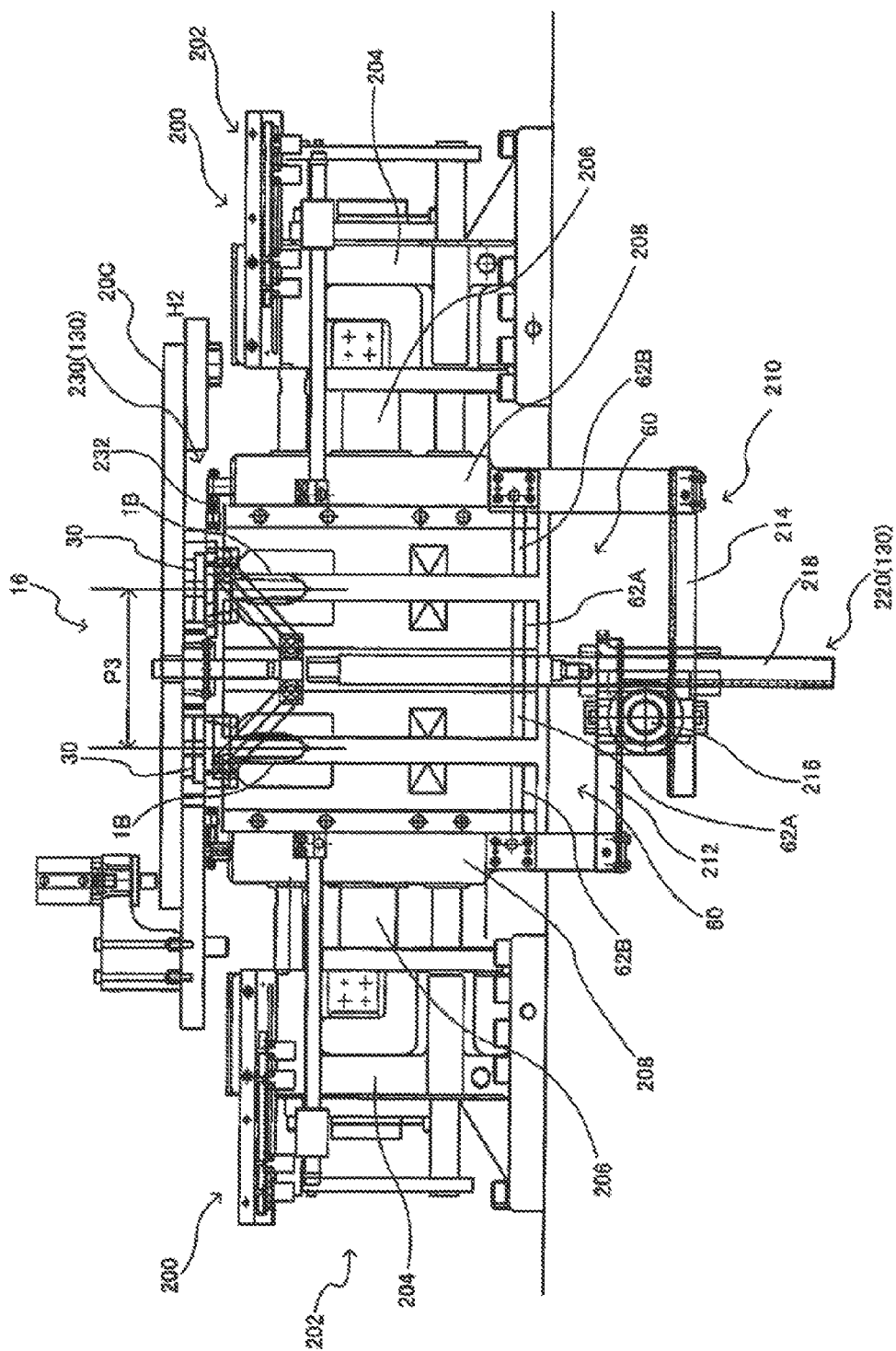
FIG. 17 is a view showing a state in which two rows of preforms disposed at a row pitch P3 have been transferred to two rows of open blow molds.

The blow molding station 16 is described below with reference to FIGS. 16 to 20. FIG. 16 shows a state in which the two rows of holding plates 30 that are set to the row pitch P3 have been transferred to the blow molding station 16 together with the transfer plate 20C. FIG. 17 shows a state in which the transfer plate has been moved downward to the height H3 from the height H1 (see FIG. 16), and the preliminary blow-molded preforms 1B held by the two rows of holding plates 30 that are set to the row pitch P3 have been transferred to the two rows of blow molds 60 that are set to an open state. In FIGS. 16 and 17, the two rows of blow molds 60 have been closed so that the row pitch is larger than P3 to some extent instead of P2 (see FIG. 5). This makes it possible to reduce the mold closing time as compared with the case of closing the blow mold 60 from the row pitch P2 after the preliminary blow-molded preform 1B has been transferred to the blow mold 60.

Figure 18:
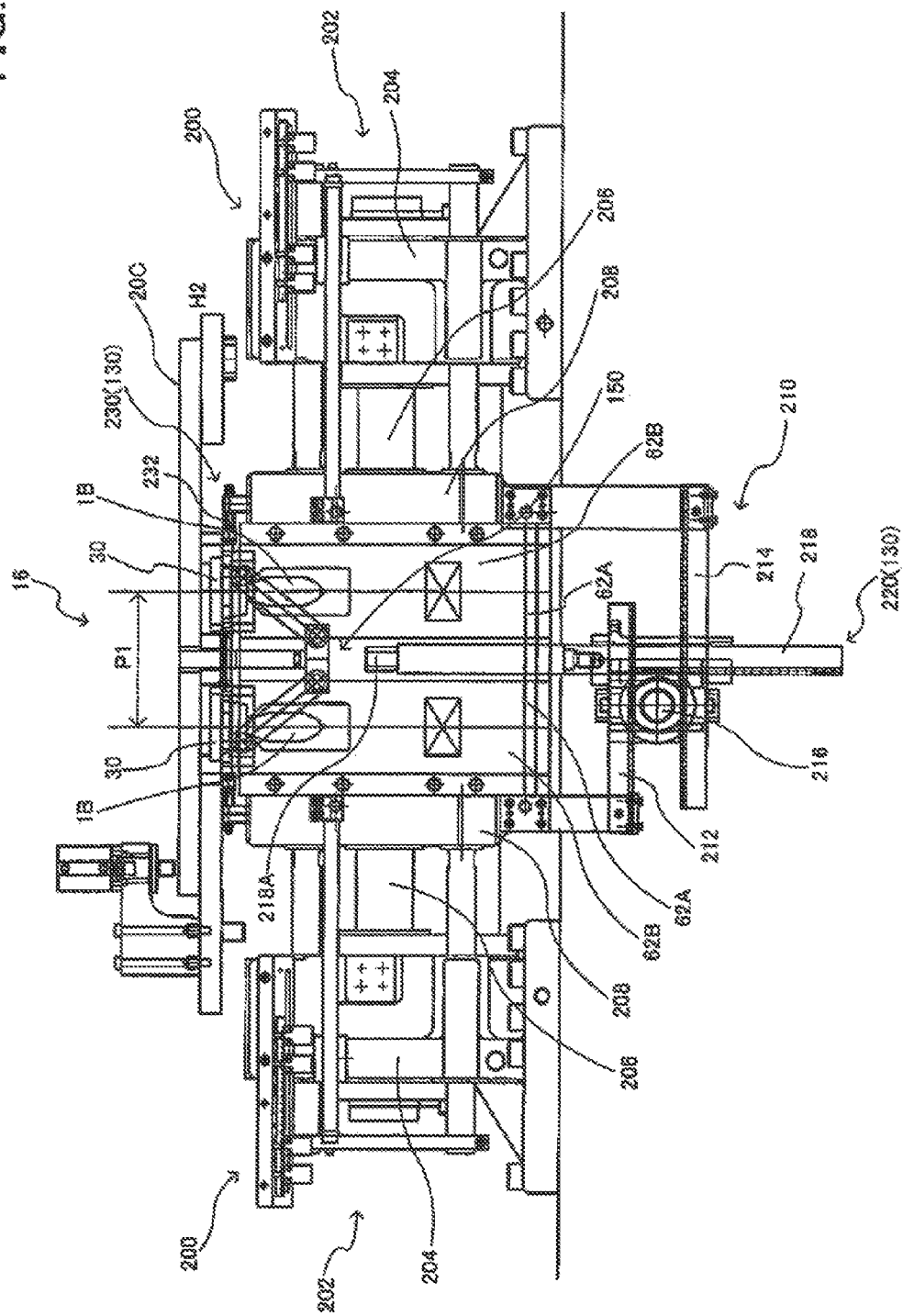
FIG. 18 is a view showing a state in which blow molds are closed (row pitch: P1).

The blow molding step is then performed by closing the two rows of blow molds 60 (see FIG. 18). A mold closing/opening device 200 that closes/opens the two rows of blow molds 60 is described below.

The mold closing/opening device 200 includes two mold closing/opening sections 202 that close/open the blow cavity split molds 62B of the two rows of blow molds 60 that are positioned on the outer side in the row direction. The mold closing/opening section 202 includes a hydraulic cylinder 204 and a rod 206, for example. Each rod 206 is connected to a mold closing plate 208 on which the blow cavity split mold 62B is secured. Since the two mold closing/opening sections 202 that respectively drive the two blow cavity split molds 62B are provided, the mold closing/opening device 200 can be formed without using a tie rod (bar).

Therefore, the blow mold 60 and the like can be removed and installed in the horizontal direction through the side of the blow molding apparatus when removing or maintaining the blow mold 60 and the like. When a horizontal tie rod is provided as shown in FIG. 10 of JP-B-8-13501, it takes time to remove and install the blow mold 60 and the like due to the horizontal tie rod.

The mold closing/opening sections 202 are hydraulically controlled in synchronization, but may not move the blow cavity split molds 62B in mechanical synchronization. In order to deal with this problem, the mold closing/opening device 200 is provided with a split mold synchronization member 210 that moves the blow cavity split molds 62B in synchronization. The split mold synchronization member 210 includes racks 212 and 214 that are respectively connected to the blow cavity split molds 62B, and a pinion gear 216 that includes a gear 216A that engages the racks 212 and 214. This makes it possible to move the blow cavity split molds 62B in synchronization.

In the blow molding station 16, the row pitch change section 130 includes a P1-P2 pitch change section 220 that increases the row pitch of the two rows of holding plates 30 that hold the preliminarily blow-molded preforms 1B from P1 to P2 in synchronization with the opening motion of the two rows of blow molds 60. The P1-P2 pitch change section 220 engages the split mold synchronization member 210 that is displaced corresponding to the synchronization movement of the blow cavity split molds 62B, and changes the row pitch of the two rows of holding plates 30 from P1 to P2 in synchronization with the opening motion of the blow cavity split molds 62B.

The P1-P2 pitch change section 220 includes a gear 216B that is provided coaxially with the gear 216A of the pinion gear 216, and a rack 218 that engages the gear 216 and is moved upward and downward. A driving rod 218A that moves the guide rod 152 upward via the link arm 150B of the row pitch change link mechanism 150 provided to the two rows of holding plates 30 is secured on the rack 218.

The row pitch change section 130 also includes a P3-P1 pitch change section 230 that reduces the row pitch of the two rows of holding plates 30 that hold the preliminarily blow-molded preforms 1B from P3 to P1 in synchronization with the closing motion of the two rows of blow molds 60. The P3-P1 pitch change section 230 includes two pressing sections 232 that protrude toward each other above the mold closing plates 208. The pressing sections 232 press the two rows of holding plates 30 or an accessory thereof when the mold closing plates 208 move in the mold closing direction, and the row pitch of the two rows of holding plates 30 is set to P1 upon completion of the mold closing motion.

Figure 19:
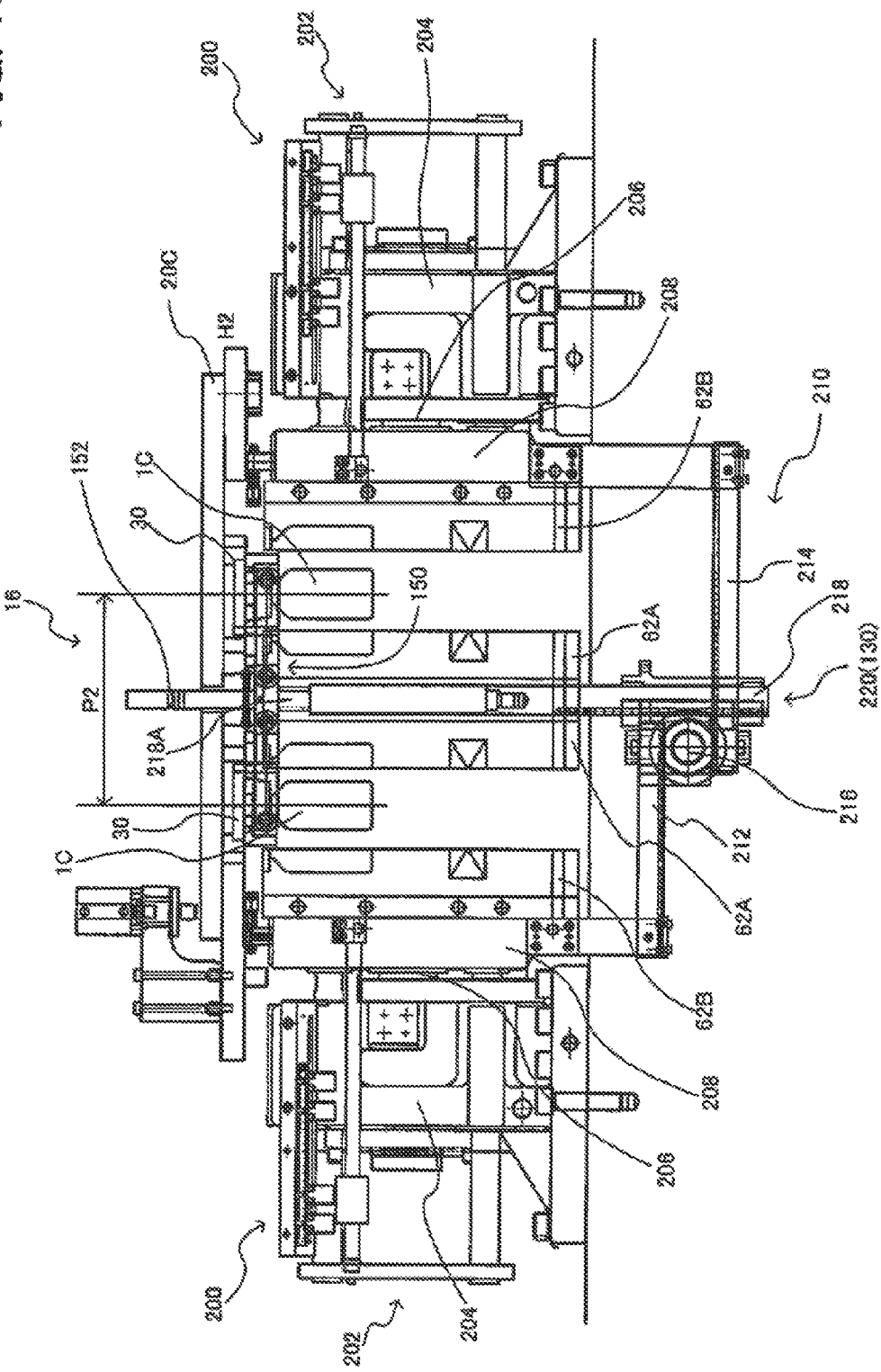
FIG. 19 is a view showing a state in which blow molds are opened (row pitch: P2).

The blow molding station 16 that includes the mold closing/opening device 200, the split mold synchronization member 210, the P1-P2 pitch change section 220, and the P3-P1 pitch change section 230 can implement the mold closing motion shown in FIG. 18 and the mold opening motion shown in FIG. 19. When implementing the mold closing motion shown in FIG. 18, the two rows of blow molds 60 are closed at the row pitch P1, and the row pitch of the two rows of holding plates 30 is also set to P1 by the P3-P1 pitch change section 230 and the row pitch change link mechanism 150. When implementing the mold opening motion shown in FIG. 19, the two rows of blow molds 60 are opened at the row pitch P2, and the link arm 150B and the guide rod 152 are moved upward by the P1-P2 pitch change section 220 and the row pitch change link mechanism 150 via the driving rod 218A so that the row pitch of the two rows of holding plates 30 is also set to P2.

Figure 20:
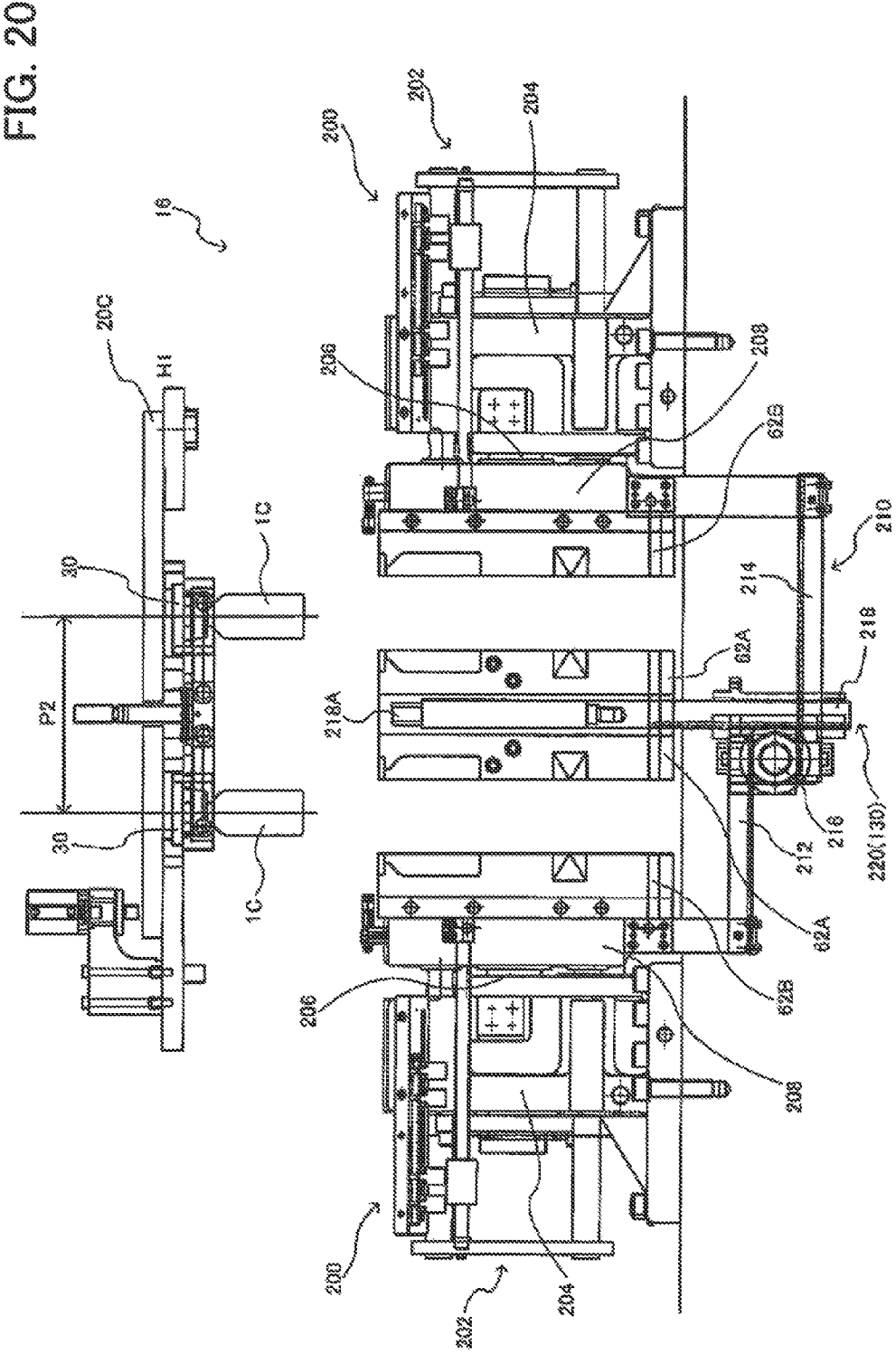
FIG. 20 is a view showing a transfer operation from a blow molding station (row pitch: P2).

FIG. 20 shows a state in which the transfer plate 20C has been returned to the height H1, and the containers C have been removed from the two rows of blow molds 60. The row pitch of the two rows of holding plates 30 is maintained at P2. The transfer plate 20C is then intermittently transferred to the ejection station 18.

2.4. Ejection Station

Figure 21:
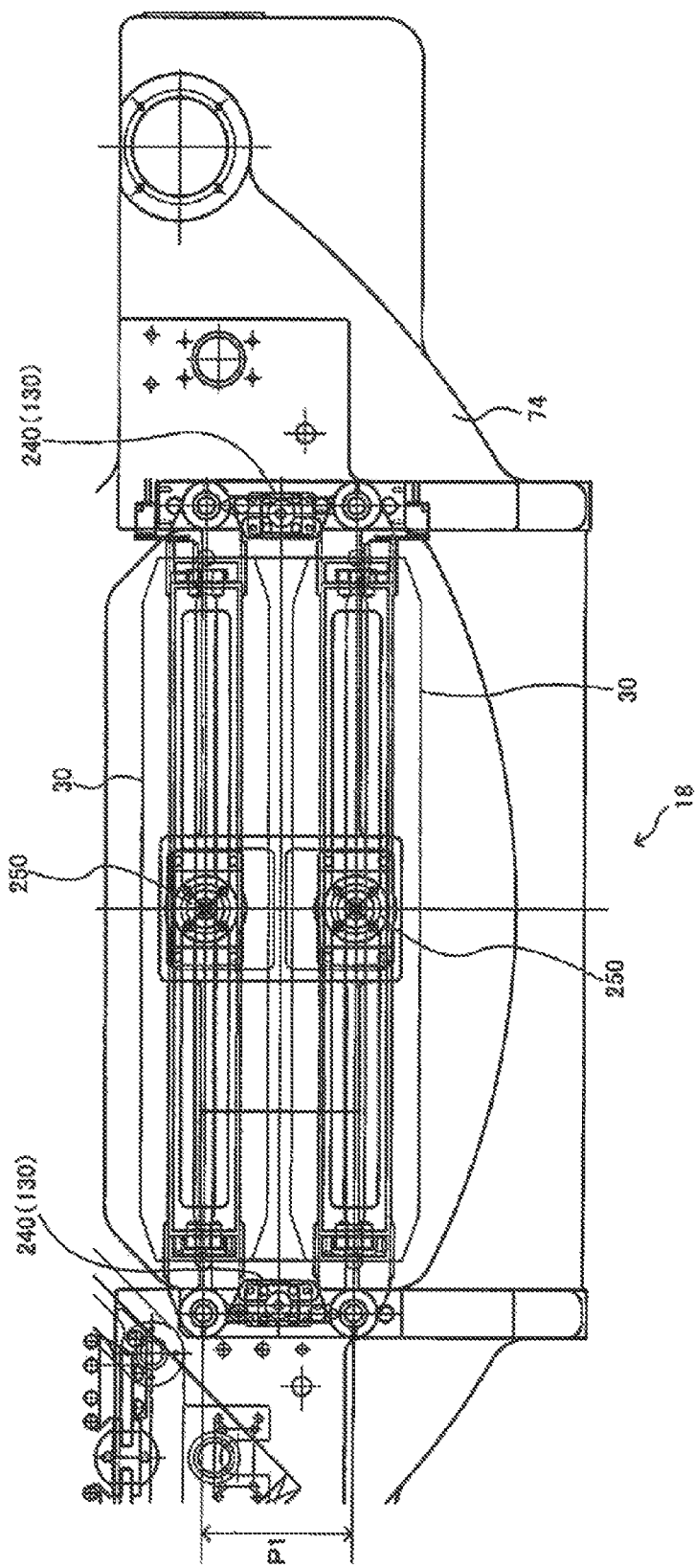
FIG. 21 is a plan view showing an ejection station.
Figure 22:
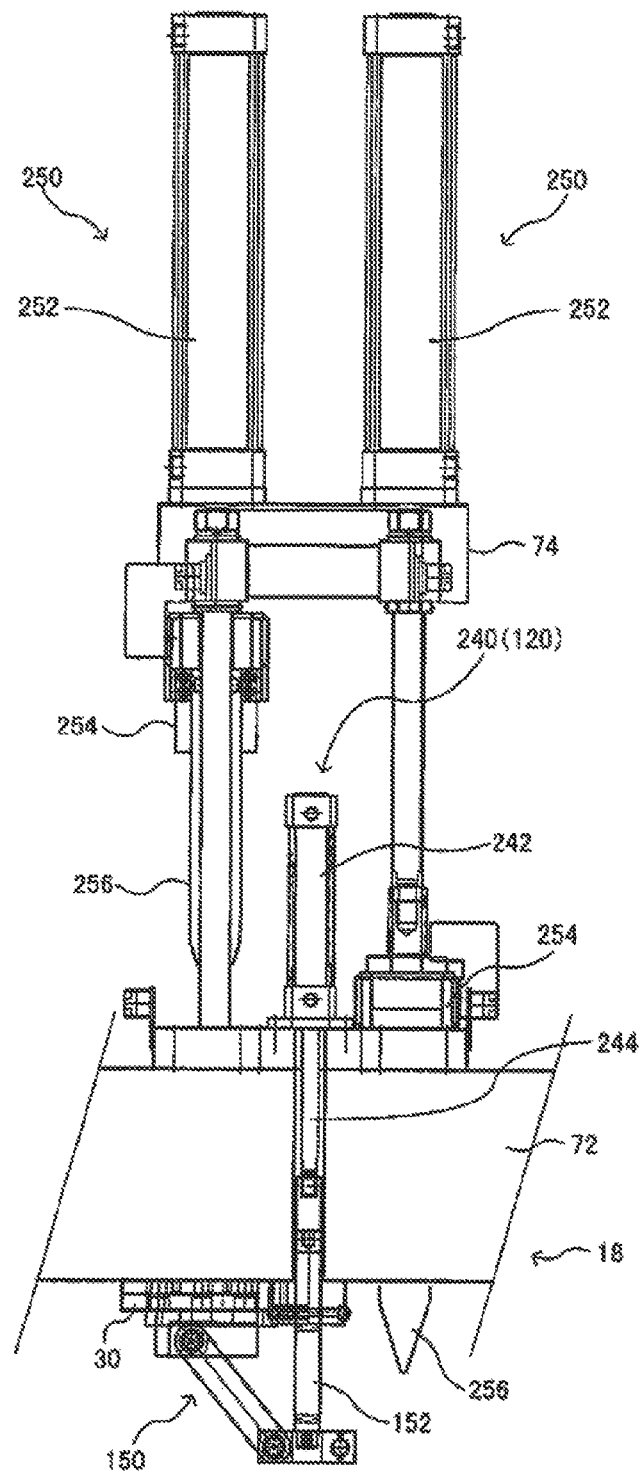
FIG. 22 is a side view showing an ejection station.

The row pitch change section 130 includes a P2-P1 pitch change section 240 that changes the row pitch of the two rows of holding plates 30 from P2 to P1 before the containers 1C are ejected from the two rows of holding plates 30 in the ejection station 18 shown in FIGS. 21 and 22. The P2-P1 pitch change section 240 is disposed on each end of the holding plate 30 in the longitudinal direction. The P2-P1 pitch change section 240 includes a cylinder 242 that is secured on the upper base 74, and a rod 244 that is inserted and removed by the cylinder 242. The rod 244 that has been driven presses the guide rod 152 of the row pitch change link mechanism 150, so that the row pitch of the two rows of holding plates 30 is changed from P2 to P1. FIGS. 21 and 22 show a state after the row pitch of the two rows of holding plates 30 has been changed to P1.

The ejection station 18 further includes an ejection section 250 that ejects the containers 1C from the two rows of holding plates 30. Each of the two rows of holding plates 30 includes a pair of split plates, and each of the neck molds 42 includes a pair of neck split molds secured on the pair of split plates. The containers 1C are ejected by increasing the interval between the pair of split plates (see FIG. 3 of JP-B-8-13501, for example).

The ejection section 250 that is provided corresponding to each row includes a cylinder 252 that is secured on the upper base 74, a rod 254 that is inserted and removed by the cylinder 252, and a wedge-like member 256 that is secured on the lower end of the rod 254. The ejection station 18 ejects the containers 1C sequentially from the two rows of holding plates 30 that are disposed at the row pitch P1. FIG. 22 shows a state in which the containers 1C have been ejected from the holding plates 30 in the right row. As shown in FIG. 21, the interval between the two rows of holding plates 30 that are disposed at the row pitch P1 is narrow. If the containers 1C are simultaneously ejected from the two rows of holding plates 30 that are disposed at the row pitch P1, the holding plates 30 interfere with each other. Such interference can be prevented by increasing the pitch of the holding plates during ejection. However, since the subsequent step is the injection molding step (row pitch: P1), it is advantageous to eject the containers 1C in a state in which the two rows of holding plates 30 are disposed at the row pitch P1 in order to omit an unnecessary change in row pitch and implement space-saving. The row pitch of the two rows of holding plates 30 can be maintained at P1 during ejection by ejecting the containers 1C sequentially from the two rows of holding plates 30.

Figure 23:
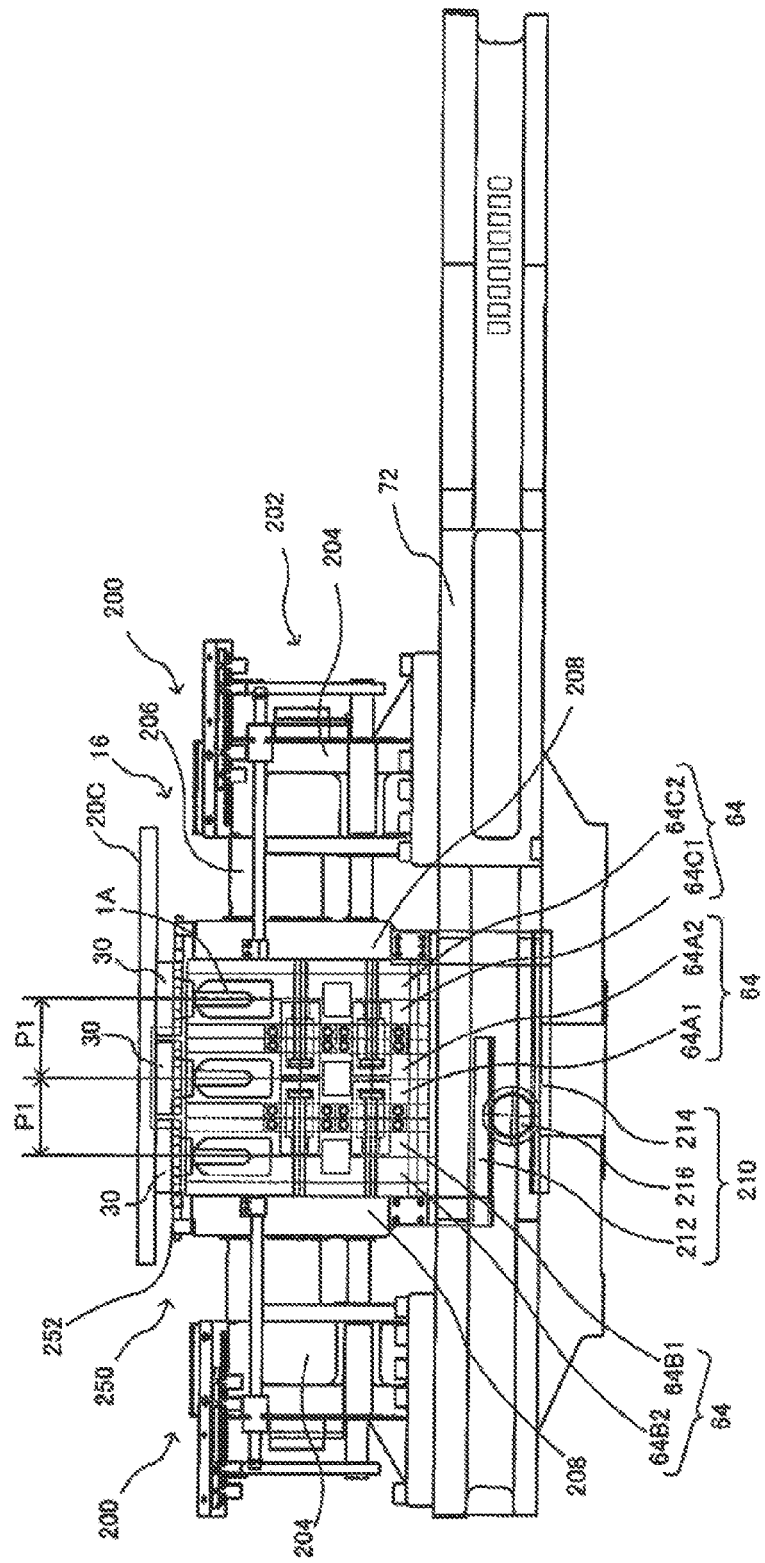
FIG. 23 is a view showing a state in which three rows of blow molds are closed.
Figure 24:
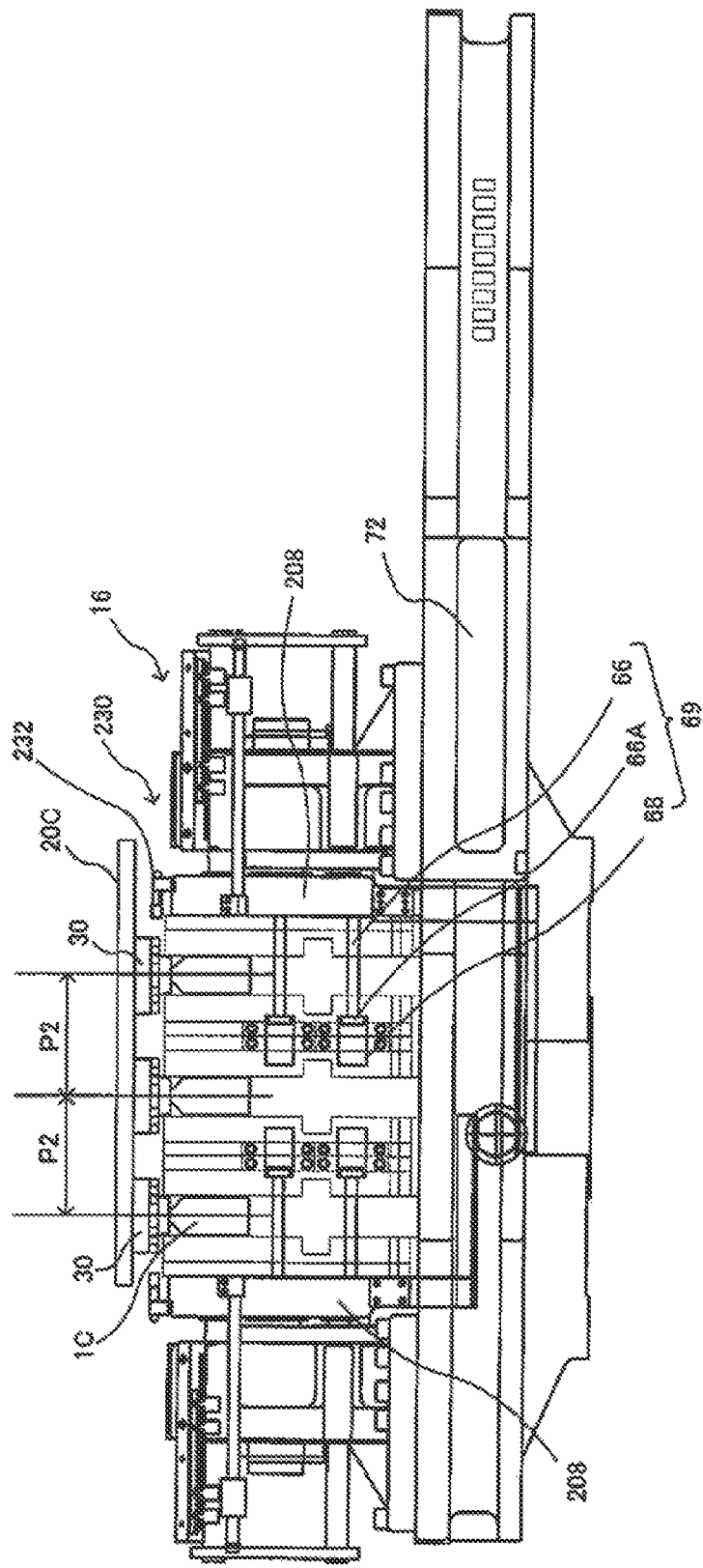
FIG. 24 is a view showing a state in which three rows of blow molds are opened.

3. Blow Molding Apparatus that Differs in the Number of Rows of Holding Plates FIGS. 23 and 24 show the blow molding station 16 of a blow molding apparatus that includes three rows of holding plates 30 and three rows of blow molds 64 (i.e., N=3). FIG. 23 shows a state in which the blow molds 64 are closed at the row pitch P1, and FIG. 24 shows a state in which the blow molds 64 are opened at the row pitch P2. In FIGS. 23 and 24, members having the same functions as those described above are indicated by identical reference symbols (numerals). Specifically, the blow molding apparatus shown in FIGS. 23 and 24 is configured in the same manner as described above, except that the three rows of holding plates 30 and the three rows of blow molds 64 are provided. The blow molding apparatus may be applied to the two-row transfer operation or the three-row transfer operation. The blow molding station 16 of the blow molding apparatus shown in FIGS. 23 and 24 includes the mold closing/opening device 200, the split mold synchronization member 210, the P1-P2 pitch change section 220, and the P3-P1 pitch change section 230. Note that the P1-P2 pitch change section 220 is omitted in FIGS. 23 and 24.

The center blow mold 64 among the three rows of blow molds 64 includes a pair of blow cavity split molds 64A1 and 64A2. The left blow mold 64 among the three rows of blow molds 64 includes a pair of blow cavity split molds 64B1 and 64B2. The right blow mold 64 among the three rows of blow molds 64 includes a pair of blow cavity split molds 64C1 and 64C2. The blow cavity split molds 64A1 and 64B1 are secured on the back side, and move integrally, and the blow cavity split molds 64A2 and 64C1 are secured on the back side, and move integrally. Each of the blow cavity split molds 64B2 and 64C2 positioned on the outer side in the row direction is secured on the mold closing plate 208.

As shown in FIG. 23, the row pitch of the three rows of blow molds 64 is P1 when the three rows of blow molds 64 are closed. When the mold closing plates 208 have been driven by the mold closing/opening sections 202, the blow molds 64 positioned on the outer side are closed. The blow cavity split mold 64B2 positioned on the outer side in the row direction presses the blow cavity split molds 64A1 and 64B1 that move integrally, and the blow cavity split mold 64C2 positioned on the outer side in the row direction presses the blow cavity split molds 64A2 and 64C1 that move integrally. The adjacent blow cavity split molds eventually close contact with each other (i.e., the three rows of blow molds 64 are closed). In this case, the pressing sections 252 secured on the mold closing plates 208 press the holding plates 30 positioned on the outer side in the row direction, and the row pitch of the three rows of holding plates 30 is set to P1.

Note that the preform 1A need not necessarily be preliminarily blow-molded in the temperature control station 14. In FIG. 23, the preform 1A that has not been preliminarily blow-molded is blow-molded into a container. Note that the preform 1A may be preliminarily blow-molded in the temperature control station 14. The preforms 1A (1B) are disposed at the pitch P3, and transferred to the blow molding station 16 regardless of whether or not the preforms have been preliminarily blow-molded. The reason therefor is described later with reference to FIG. 24.

When the blow molding operation has completed, the mold closing/opening sections 202 drive the mold closing plates 208 to open the three rows of blow molds 64. In this case, the row pitch of the three rows of holding plate 30 is changed from P1 to P2 due to the operation of the split mold synchronization member 210 and the P1-P2 pitch change section 220. When the number of rows of blow molds is an odd number (e.g., N=3), the split mold synchronization member 210 may synchronize the pair of blow cavity split molds of the blow mold that is positioned at the center while synchronizing the blow cavity split molds that are positioned on the outer side in the row directions. The split mold synchronization member 210 may also synchronize a pair of blow molds among the N rows of blow molds that move symmetrically.

The blow cavity split molds 64B2 and 64C2 positioned on the outer side in the row direction are opened by driving the mold closing plates 208. The blow molding apparatus shown in FIGS. 23 and 24 includes a mold opening synchronization member 69. The mold opening synchronization member 69 includes a shaft 66 that is secured on the mold closing plate 208. A flange section 66A is formed on the end of the shaft 66. The mold opening synchronization member 69 includes a stopper section 68 that engages the flange section 66A at a position corresponding to the blow cavity split molds 64A1 and 64B1 that move integrally, or the blow cavity split molds 64A2 and 64C1 that move integrally. As shown in FIG. 24, when the row pitch of the three rows of blow molds 64 is P2 (open state), the stopper section 68 engages the flange section 66A, and moves the blow cavity split molds 64A1 and 64B1 or the blow cavity split molds 64A2 and 64C1 to the open position. The flange section 66A does not interfere with the stopper section 68 when the three rows of blow molds 64 are closed.

The row pitch of the three rows of blow molds 64 may be set to P2 when transferring the preform 1A (1B) in the open state shown in FIG. 24. Note that the row pitch of the three rows of blow molds 64 may be set to P3 (P1<P3<P2) in the same manner as described above since the diameter of the body of the preform 1A (1B) is smaller than that of the container 1C (i.e., the preform 1A (1B) does not interfere with the three rows of blow molds 64 that have been opened). Specifically, the feature that sets the row pitch of the N rows of preforms transferred to the blow molds to P3 is suitable for a blow molding apparatus that can deal with a transfer operation that differs in the number of rows (e.g., two-row transfer operation or three-row transfer operation) in addition to the case of transferring preliminarily blow-molded preforms.

The versatility of the blow molding apparatus can be improved by appropriately changing the number of rows (N=2 or N=3).

4. Holding Plate Flexure Prevention Mechanism

Figure 25:
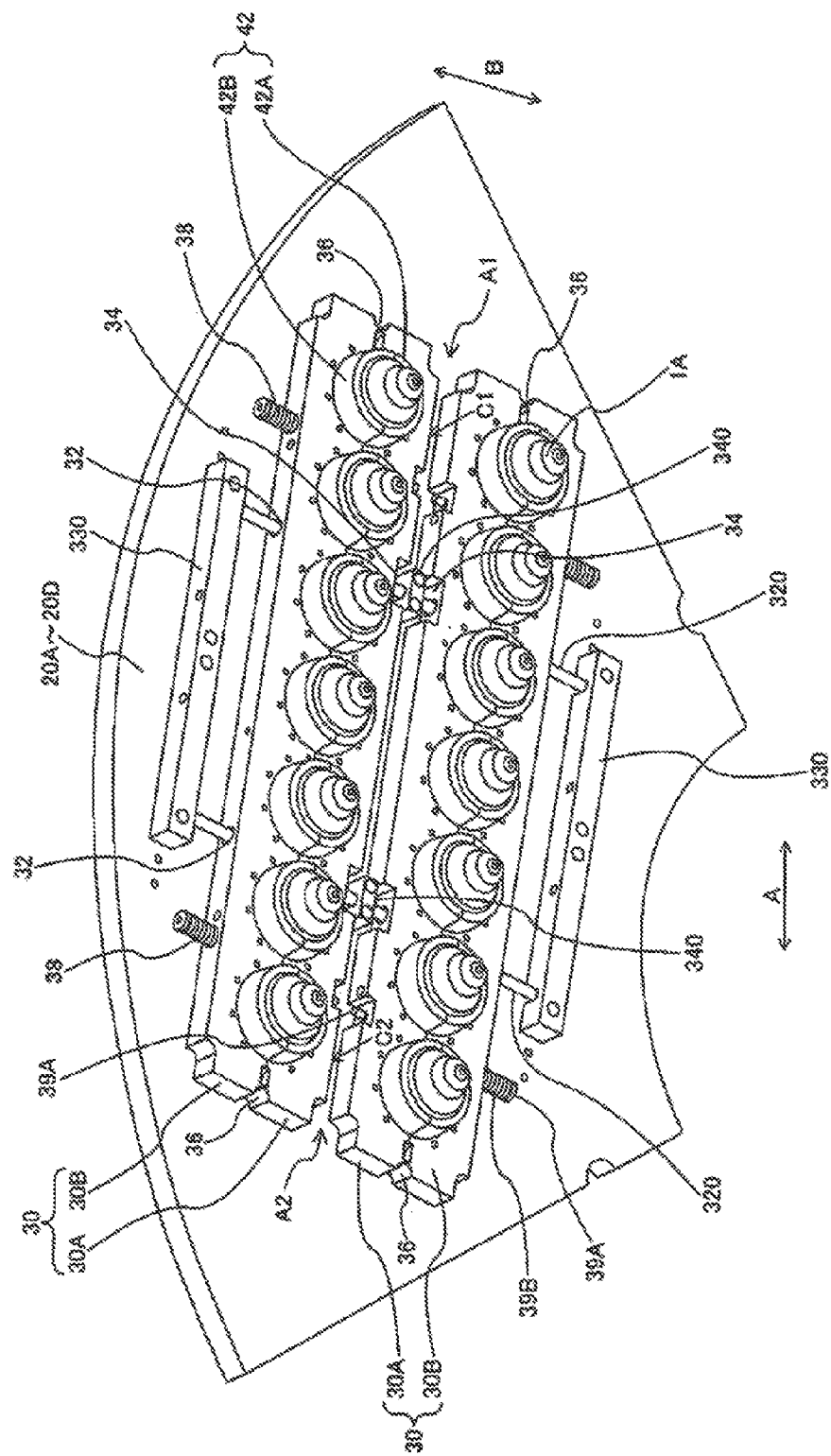
FIG. 25 is a schematic oblique view showing two rows of holding plates secured on a support-transfer member.
Figure 26:
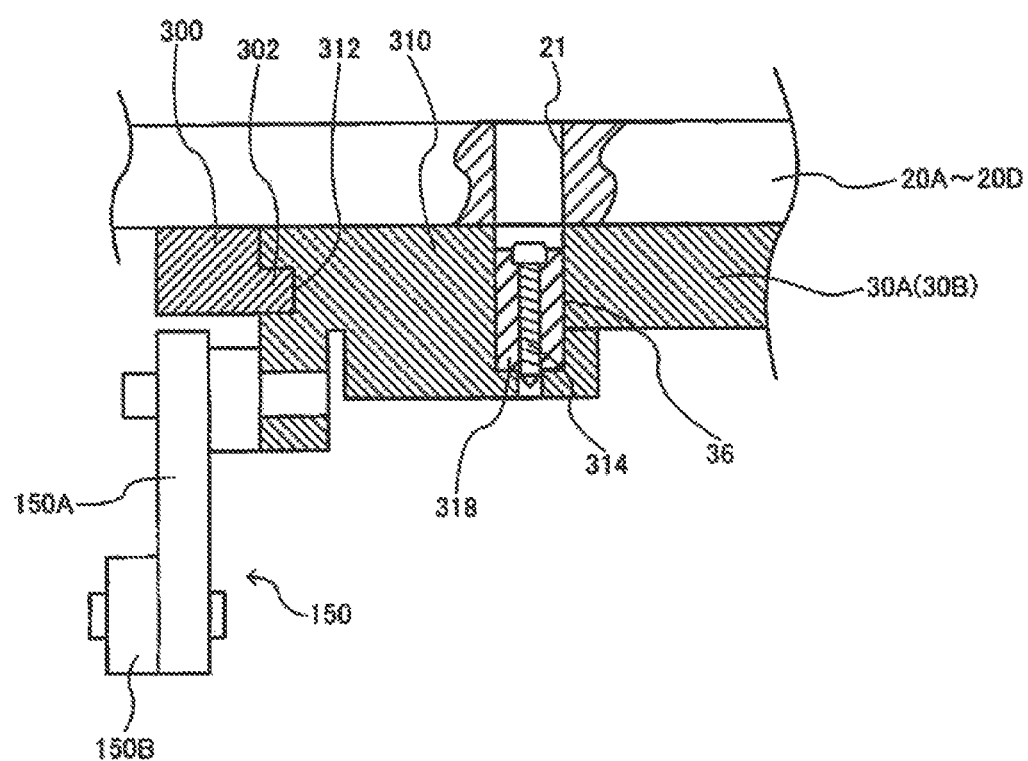
FIG. 26 is a cross-sectional view showing a rail member and a guide member that are disposed on each end of two rows of holding plates in the longitudinal direction.

FIG. 25 shows two (i.e., N) rows of holding plates 30 that are secured on the transfer plates 20A to 20D. FIG. 26 is a cross-sectional view showing a rail member 300 and a guide member 310 that are disposed on each end (A1 and A2) of the two rows of holding plates 30 shown in FIG. 25 in the longitudinal direction A. Note that the flexure prevention mechanism for the two rows of holding plates 30 shown in FIGS. 25 and 26 may be applied to the above embodiments, and may also be applied to a case where the injection molding pitch and the blow molding pitch are changed (see JP-B-6-49331, for example).

The transfer plate (20A to 20D) shown in FIG. 25 includes the rail member 300 shown in FIG. 26 on each end (A1 and A2) of the two rows of holding plates 30 in the longitudinal direction A. The rail member 300 may include a rail 302.

The transfer plate (20A to 20D) shown in FIG. 25 includes at least one (e.g., two) reinforcement shaft 320 that is provided along the row direction B of the two rows of holding plates 30, and two first securing sections 330 that secure either end of the reinforcement shaft 320.

The guide member 310 is provided on each end (A1 and A2) of the two rows of holding plates 30 in the longitudinal direction A, the guide member 310 being guided along the rail member 300, and supporting the holding plate 30 so that the row pitch of the two rows of holding plates 30 can be changed (see FIG. 26). As shown in FIG. 26, the guide member 310 may have a rail groove 312 that engages the rail 302 of the rail member 300. Each of the two rows of holding plates 30 has two first through-holes 32 that receive the reinforcement shaft 320.

If the two rows of holding plates 30 are supported on only the ends A1 and A2 in the longitudinal direction A (see FIG. 25), the two rows of holding plates 30 may flex in the intermediate area in the longitudinal direction A. In order to deal with this problem, the first through-holes 32 are formed in the two rows of holding plates 30 in the intermediate area in the longitudinal direction A. The reinforcement shaft 320 is inserted into each first through-hole 32, and each end of the reinforcement shaft 320 is secured on the first securing section 330. The reinforcement shaft 320 thus suppresses flexure of the two rows of holding plates 30. Therefore, the preforms 1A (containers 1C) can be molded at a uniform height using the neck molds 42 held by the two rows of holding plates 30 independently of the position of each holding plate 30 in the longitudinal direction A, so that uniform molding quality can be achieved.

As shown in FIG. 25, the transfer plate (20A to 20D) may further include a second securing section 340 that secures the intermediate part of the reinforcement shaft 320 at a position between the two rows of holding plates 30. Since flexure of the reinforcement shaft 320 is suppressed by the second securing section 340, flexure of the two rows of holding plates 30 can be further suppressed.

When the row pitch change force is applied to the guide member 310 from the row pitch change link mechanism 150, the guide member 310 moves along the rail member 300, so that the row pitch of the two rows of holding plates 30 is changed. The resulting row pitch is maintained by the guide rod 152 and the row pitch-keeping member 160 (see FIG. 14). Each end (A1 and A2) of the two rows of holding plates 30 in the longitudinal direction A (see FIG. 25) is positioned between the transfer plate (20A to 20D) and the guide member 310.

As shown in FIG. 25, each of the two rows of holding plates 30 includes the pair of split plates 30A and 30B, and the neck mold 42 includes the pair of neck split molds 42A and 42B that are respectively secured on the split plates 30A and 30B. Therefore, the containers 1C can be ejected from the neck molds 42 by increasing the interval between the pair of split plates 30A and 30B in the ejection station 18.

The split plate 30A of each of the two rows of holding plates 30 has a first depression 34 at a position opposite to the second securing section 340. When the containers 1C are ejected by increasing the interval between the pair of split plates 30A and 30B, the split plates 30A of the two rows of holding plates 30 almost come in contact with each other (see FIG. 8). In this case, since at least part of the second securing section 340 is disposed within the first depression 34 shown in FIG. 25, a situation in which the second securing section 340 interferes with the split plate 30A can be prevented.

As shown in FIG. 25, a centering second depression 36 in the shape of a semicircle or the like may be formed on each end (A1 and A2) of the pair of split plates 30A and 30B in the longitudinal direction A. As shown in FIG. 26, a centering pin 318 is inserted into the second depression 36 formed in the pair of split plates 30A and 30B via a hole 21 formed in the transfer plate (20A to 20D), and is secured on the guide member 310 using a bolt 314. The centering pin 318 is thus received by the second depression 36 formed in the pair of split plates 30A and 30B. Therefore, the center position of the pair of split plates 30A and 30B can be set using the centering pin 318 that moves together with the guide member 310 that changes the row pitch.

As shown in FIG. 25, each of the two rows of holding plates 30 may include two second through-holes 38 that are formed in the row direction B at a plurality of positions in the longitudinal direction A, two guide shafts 39A that are respectively inserted into the second through-holes 38, and two compression coil springs 39B (i.e., biasing members) that are respectively inserted into the guide shafts 39A, and biases the pair of split plates 30A and 30B in the closing direction. The reinforcement shafts 320 may be disposed between the guide shafts 39A in the longitudinal direction A.

In this case, the two rows of holding plates 30 are supported by the guide members 310 on each end (A1 and A2) (see FIG. 25) in the longitudinal direction A (see FIG. 26), supported by the guide shafts 39A in the inward position, and supported by the reinforcement shafts 320 in a further inward position. This makes it possible to suppress flexure of the two rows of holding plates 30 over the entire area in the longitudinal direction A. It is preferable to provide the guide shafts 39A that support the biasing members 39B at remote positions in the longitudinal direction A since a biasing force that biases the pair of split plates 30A and 30B in the closing direction can be applied over the entire area in the longitudinal direction A.

The two rows of holding plates 30 may flex due to flexure of the transfer plate (20A to 20D) that supports the two rows of holding plates 30. For example, the neck molds 42 are closed in the blow molding station 16 after the transfer plate (20A to 20D) has been moved downward. If the transfer plate (20A to 20D) that has been moved downward flexes in the blow molding station 16, the two rows of holding plates 30 also flex, so that the quality of the container 1C may deteriorate.

The blow molding station 16 may include a plurality of (e.g., two) stoppers (not shown) that come in contact with the transfer plate (20A to 20D) that has been moved downward to specify the lower limit position of the transfer plate (20A to 20D) at a position (C1 and C2) (see FIG. 25) between the two rows of holding plates 30. This makes it possible to suppress flexure of the transfer plate (20A to 20D) and the two rows of holding plates 30.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term cited with a different term having a broader meaning or the same meaning at least once in the specification and the drawings can be replaced by the different term in any place in the specification and the drawings.

The invention may be applied to a horizontal transfer blow molding apparatus instead of a rotary transfer blow molding apparatus. The above embodiments have been described taking an example in which N is 2 or 3. When N is an odd number, N rows of blow molds may be configured in the same manner as in the case where N is 3. When N is an even number, two rows of blow molds may be provided in parallel. Alternatively, one blow mold may be provided on one side of a center blow mold that is opened line-symmetrically when N is an odd number, and an even number of blow molds may be disposed on the other side of the center blow mold.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A neck mold assembly comprising:
    N rows of holding plates, N being an integer equal to or larger than 2, and each of the N rows of holding plates holding a plurality of neck molds; and
    a supporting-mechanism that supports the N rows of holding plates, the supporting mechanism including:
    at least one reinforcement shaft that is provided along a row direction of the N rows of holding plates; and
    two first securing sections that are secured at either end of the at least one reinforcement shaft,
    each of the N rows of holding plates including:
        at least one first through-hole formed therein that receives the at least one reinforcement shaft
        a pair of split plates that secures a pair of neck split molds;
        two second through-holes that are formed in the row direction at a plurality of positions in a longitudinal direction;
        two guide shafts that are respectively inserted into the two second through-holes; and
        two biasing members that are respectively inserted into the two guide shafts, and bias the pair of split plates in a closing direction.

2. The neck mold assembly as defined in claim 1,
    the at least one reinforcement shaft being disposed between the two guide shafts in the longitudinal direction.

3. The neck mold assembly as defined in claim 2,
    the support-transfer member further including a second securing section that secures an intermediate part of the at least one reinforcement shaft at a position between the N rows of holding plates.

4. The neck mold assembly as defined in claim 3,
    one of the pair of split plates of each of the N rows of holding plates having a first depression at a position opposite to the second securing section.

5. The neck mold assembly as defined in claim 2,
    each of the N rows of holding plates including a centering second depression formed on each end of the pair of split plates in the longitudinal direction.

6. A neck mold assembly comprising:
    N rows of holding plates, N being an integer equal to or larger than 2, and each of the N rows of holding plates holding a plurality of neck molds; and
    a supporting-mechanism that supports the N rows of holding plates, the supporting mechanism including:
    at least two reinforcement shafts that are provided along a row direction of the N rows of holding plates; and
    a first securing section that is secured to the at least two reinforcement shafts,
    each of the N rows of holding plates including:
        at least two first through-holes formed therein that respectively receive one of the at least two reinforcement shafts;
        a pair of split plates that secures a pair of neck split molds.

7. The neck mold assembly as defined in claim 6, wherein each of the N rows of holding plates further comprises:
    a second through-hole that is formed in the row direction;
    a guide shaft that is inserted into the second through-hole; and
    a biasing member that biases the pair of split plates in a closing direction.

8. The neck mold assembly as defined in claim 7, wherein each of the N rows of holding plates further comprises:
    an additional second through-hole that is formed in the row direction;
    an additional guide shaft that is inserted into the additional second through-hole; and
    an additional biasing member that biases the pair of split plates in a closing direction.

9. The neck mold assembly as defined in claim 8, wherein the two biasing members are attached to the two guide shafts, respectively.

10. The neck mold assembly as defined in claim 7, wherein the biasing member is inserted into the guide shaft.

11. The neck mold assembly as defined in claim 6, wherein the first securing section is configured to secure a relative distance between the at least two reinforcement shafts.

12. The neck mold assembly as defined in claim 11, further comprising:
    an additional first securing section that is secured to the at least two reinforcement shafts, wherein the two first securing sections are disposed at opposite ends of the at least two reinforcement shafts.

13. The neck mold assembly as defined in claim 11, further comprising:
    a second securing section that is secured to the at least two reinforcement shafts and that secures a relative distance between the at least two reinforcement shafts.

14. The neck mold assembly as defined in claim 13, wherein the second securing section is disposed at an intermediate part of each of the at least two reinforcement shafts.

15. The neck mold assembly as defined in claim 13, wherein the second securing section is disposed between two of the N rows of holding plates.

16. The neck mold assembly as defined in claim 13,
    one of the pair of split plates of each of the N rows of holding plates having a first depression at a position opposite to the second securing section.

17. The neck mold assembly as defined in claim 6,
    each of the N rows of holding plates including a centering second depression formed on each end of the pair of split plates in the longitudinal direction.

* * * * *